US008006306B2

(12) United States Patent
Gopalan et al.

(10) Patent No.: US 8,006,306 B2
(45) Date of Patent: *Aug. 23, 2011

(54) EXPLOIT-BASED WORM PROPAGATION MITIGATION

(75) Inventors: Prem Gopalan, Cambridge, MA (US); Kyle Jamieson, Cambridge, MA (US); Panayiotis Mavrommatis, Cambridge, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 941 days.

This patent is subject to a terminal disclaimer.

(21) Appl. No.: 11/387,114

(22) Filed: Mar. 21, 2006

(65) Prior Publication Data
US 2007/0226802 A1  Sep. 27, 2007

(51) Int. Cl.
G06F 21/00 (2006.01)
(52) U.S. Cl. ........... 726/24; 726/22; 726/23; 726/25
(58) Field of Classification Search ............. 726/22–25; 713/187–188
See application file for complete search history.

(56) References Cited

U.S. PATENT DOCUMENTS

| | | | |
|---|---|---|---|
| 6,910,134 B1 * | 6/2005 | Maher et al. ............ | 726/24 |
| 7,181,769 B1 * | 2/2007 | Keanini et al. ........... | 726/23 |
| 7,325,097 B1 * | 1/2008 | Darcy .................. | 711/117 |
| 2003/0041264 A1 * | 2/2003 | Black et al. ............ | 713/201 |
| 2003/0204632 A1 * | 10/2003 | Willebeek-LeMair et al. ................. | 709/249 |
| 2004/0083299 A1 * | 4/2004 | Dietz et al. ............ | 709/230 |
| 2006/0107321 A1 * | 5/2006 | Tzadikario ............. | 726/22 |
| 2006/0212942 A1 * | 9/2006 | Barford et al. .......... | 726/24 |
| 2007/0121574 A1 * | 5/2007 | Igarashi et al. ......... | 370/351 |

OTHER PUBLICATIONS

Weaver, Nicholas et al., "Very Fast Containment of Scanning Worms", Usenix Security Symposium, Aug. 9-13, 2004.
Newsome, J. et al., "Polygraph: automatically generating signatures for polymorphic", 2005 IEEE Symposium on Security and Privacy, pp. 226-241.
Rabin, Michael O., "Fingerprinting by Random Polynomials", 1981.
D. Moore and C. Shannon, "Code-Red: a Case Study on the Spread and Victims of an Internet Worm", in Proceedings of the 2002 ACM SICGOMM Internet Measurement Workshop, Marseille, France, Nov. 2002, pp. 273-284. http://www.google.com/url?sa=t&ct=res&cd=1&url=http%3A//www.caida.org/outreach/papers/2002/codered/codered.pdf&ei=3kAgRLGIHa2GavDo3NkD&sig2=DH2J6ecjAE1Hcv082MTmGw.
D.Moore, C.Shannon, G.Voelker, and S.Savage. Internet Quarantine: Requirements for Containing Self-Propagating Code. In IEEE Proceedings of the INFOCOM, Apr. 2003. http://www.google.com/url?sa=t&ct=res&cd=1&url=http%3A//www-cse.ucsd.edu/%7Esavage/papers/Infocom03.pdf&ei=gj8gRPXDObuwasHI5d0D&sig2=IzkDAbeeaJzJDreLgPCZoA.
Sumeet Singh, Cristian Estan, George Varghese, Stefan Savage: Automated Worm Fingerprinting. OSDI 2004: 45-60. http://www.google.com/url?sa=t&ct=res&cd=1&url=http%3A//www-cse.ucsd.edu/%7Esavage/papers/OSDI04.pdf&ei=_UAgRMT-CcaKabiFxbkD&sig2=FacfKv4JFmUcgHtCm3ifWO.

(Continued)

Primary Examiner — Nasser Moazzami
Assistant Examiner — Ghazal Shehni
(74) Attorney, Agent, or Firm — Park, Vaughan, Fleming & Dowler LLP

(57) ABSTRACT

A system, method and computer program product for exploit-based worm detection and mitigation are disclosed. The system, method, and computer program product are configured to identify a signature representing content prevalent in network traffic, determine if the traffic including the signature exhibits propagation, determine if the traffic including the signature exhibits connectedness, and generate a worm signature based on the signature if the signature exhibits both connectedness and propagation.

20 Claims, 19 Drawing Sheets

OTHER PUBLICATIONS

Kim, H.-A. and Karp, B., Autograph: Toward Automated, Distributed Worm Signature Detection, in the Proceedings of the 13th Usenix Security Symposium (Security 2004), San Diego, CA, Aug. 2004, http://www.google.com/url?sa=t&ct=res&cd=1&url=http%3A//www.cs.cmu.edu/%7Ebkarp/autograph-usenixsec2004.pdf&ei=GkEgRNa1Fcr0aI2njKwD&sig2=SWtWWF0Jp5JgKPbBwOjgDO.

Broder, A.Z., "Some Applications of Rabin's fingerprinting method", R. Capocelli, A. DeSantis, U. Vaccaro (eds, Sequences II: Methods in Communications, Security, and Computer Science, Springer-Verlag, pp. 1-10(1993).

Snort: Open source network intrusion detection system. www.snort.org, 2002.

\* cited by examiner

|  | Email Worm Traffic | Normal Email Traffic |
|---|---|---|
| Amount of invariant content across clients | High 270 | Low 271 |
| Number of servers contacted | High 272 | Low 273 |
| Frequency of same or similar emails | High 274 | Low 275 |

FIG. 14

EXPLOIT-BASED WORM PROPAGATION MITIGATION

This invention relates to techniques to mitigate against worm propagation in computer networks.

Networks allow computers to communicate with each other whether via a public network, e.g., the Internet or private networks. For instance, many enterprises have internal networks (intranets) to handle communication throughout the enterprise. Hosts on these networks can generally have access to both public and private networks.

Managing these networks is increasingly costly, while the business cost of dealing with network problems becomes increasingly high. Managing an enterprise network involves a number of inter-related activities including establishing a topology, establishing policies for the network and monitoring network performance. Another task for managing a network is detecting and dealing with security violations, such as denial of service attacks, worm propagation and so forth.

SUMMARY

According to an aspect of the invention, a computer program product resides on a computer readable medium for intrusion detection. The computer program product includes instructions for causing a processor to identify a signature representing content prevalent in network traffic, determine if the traffic including the signature exhibits propagation, determine if the traffic including the signature exhibits connectedness, and generate a worm signature based on the signature if the signature exhibits both connectedness and propagation.

Embodiments can include one or more of the following.

The instructions to identify a signature representing content prevalent in network traffic can include instructions to receive packet payload data and analyze the packet payload data to identify recurring sets of bits. The instructions to analyze the packet payload data to identify recurring sets of bits can include instructions to extract a plurality of sets of bits having a predetermined length, compute a hash of each of the plurality of sets of bits, and count the number of times a particular hash value occurs during a period of time.

The computer program product can also include instructions to consolidate multiple signatures into a single signature. The instructions to determine if the traffic including the signature exhibits propagation can include instructions to generate a table associated with the propagation of traffic including a particular signature in the network. The table can include a tree with a number of levels, each of the levels including a number of hosts.

The instructions to determine if the traffic including the signature exhibits propagation can include instructions to compare the number of levels to a first value, compare the number of hosts in each of the levels to a second value, and identify the signature as exhibiting propagation if the number of levels is greater than or equal to the first value and the number of hosts in each of the levels is greater than or equal to the second value. The instructions to determine if the traffic including the signature exhibits connectedness can include instructions to compare a number of destinations contacted by a host with a packet including the signature to a threshold, identify the host as exhibiting connectedness if the number of destinations exceeds a threshold, and identify the signature as exhibiting connectedness if the number of such hosts exceeds a threshold.

The computer program product can also include instructions to detect email-based worms. The instructions for causing a processor to detect email-based worms can include instructions for causing a processor to identify a signature representing content prevalent in email-based network traffic, generate a client list for the identified signature, determine if a number of clients included in the client list exceeds a threshold, and generate a worm signature based on the signature if the number of clients included in the client list exceeds the threshold.

According to an aspect of the invention, a method includes identifying a signature representing content prevalent in network traffic, determining if the traffic including the signature exhibits propagation, determining if the traffic including the signature exhibits connectedness, and generating a worm signature based on the signature if the signature exhibits both connectedness and propagation.

Embodiments can include one or more of the following. The method can also include receiving packet payload data and analyzing the packet payload data to identify recurring sets of bits. The method can also include extracting a plurality of sets of bits having a predetermined length, computing a hash of each of the plurality of sets of bits, and counting the number of times a particular hash value occurs during a period of time. The method can also include consolidating multiple signatures into a single signature. The method can also include generating a table associated with the propagation of traffic including a particular signature in the network, the table comprising a tree with a number of levels, each of the levels including a number of hosts. The method can also include comparing the number of levels to a first value, comparing the number of hosts in each of the levels to a second value, and identifying the signature as exhibiting propagation if the number of levels is greater than or equal to the first value and the number of hosts in each of the levels is greater than or equal to the second value.

Determining if the traffic including the signature exhibits connectedness can include comparing a number of destinations contacted by a host with a packet including the signature to a threshold, identifying the host as exhibiting connectedness if the number of destinations exceeds a threshold, and identifying the signature as exhibiting connectedness if the number of such hosts exceeds a threshold. The method can also include detecting email-based worms.

According to an aspect of the invention, an intrusion detection system includes a system. The system is configured to identify a signature representing content prevalent in network traffic, determine if the traffic including the signature exhibits propagation, determine if the traffic including the signature exhibits connectedness; and generate a worm signature based on the signature if the signature exhibits both connectedness and propagation.

Embodiments can include one or more of the following.

The system can be further configured to identify recurring sets of bits. The system can be further configured to extract a plurality of sets of bits having a predetermined length, compute a hash of each of the plurality of sets of bits, and count the number of times a particular hash value occurs during a period of time.

The system can be further configured to consolidate multiple signatures into a single signature. The system can be further configured to generate a table associated with the propagation of traffic including a particular signature in the network. The table can include a tree with a number of levels, each of the levels including a number of hosts.

The system can be further configured to compare the number of levels to a first value, compare the number of hosts in each of the levels to a second value, and identify the signature as exhibiting propagation if the number of levels is greater than or equal to the first value and the number of hosts in each of the levels is greater than or equal to the second value. The system can be further configured to compare a number of destinations contacted by a host with a packet including the signature to a threshold, identify the host as exhibiting connectedness if the number of destinations exceeds a threshold, and identify the signature as exhibiting connectedness if the number of such hosts exceeds a threshold.

The system can be further configured to detect email-based worms. The system can be further configured to identify a signature representing content prevalent in email-based network traffic, generate a client list for the identified signature, determine if a number of clients included in the client list exceeds a threshold, and generate a worm signature based on the signature if the number of clients included in the client list exceeds the threshold.

In some aspects, automatically generating and distributing worm signatures to various signature-based security devices provides the advantage of reducing the time between identification of a worm and mitigation of the spread of the worm.

In some aspects, generating and distributing worm signatures to various security devices allows the devices to remove or drop only packets identified as potential worms. This provides the advantage of allowing innocuous traffic to continue to be delivered.

DESCRIPTION OF DRAWINGS

FIG. 14 is a block diagram of email traffic attributes.

DETAILED DESCRIPTION

Figure 1:
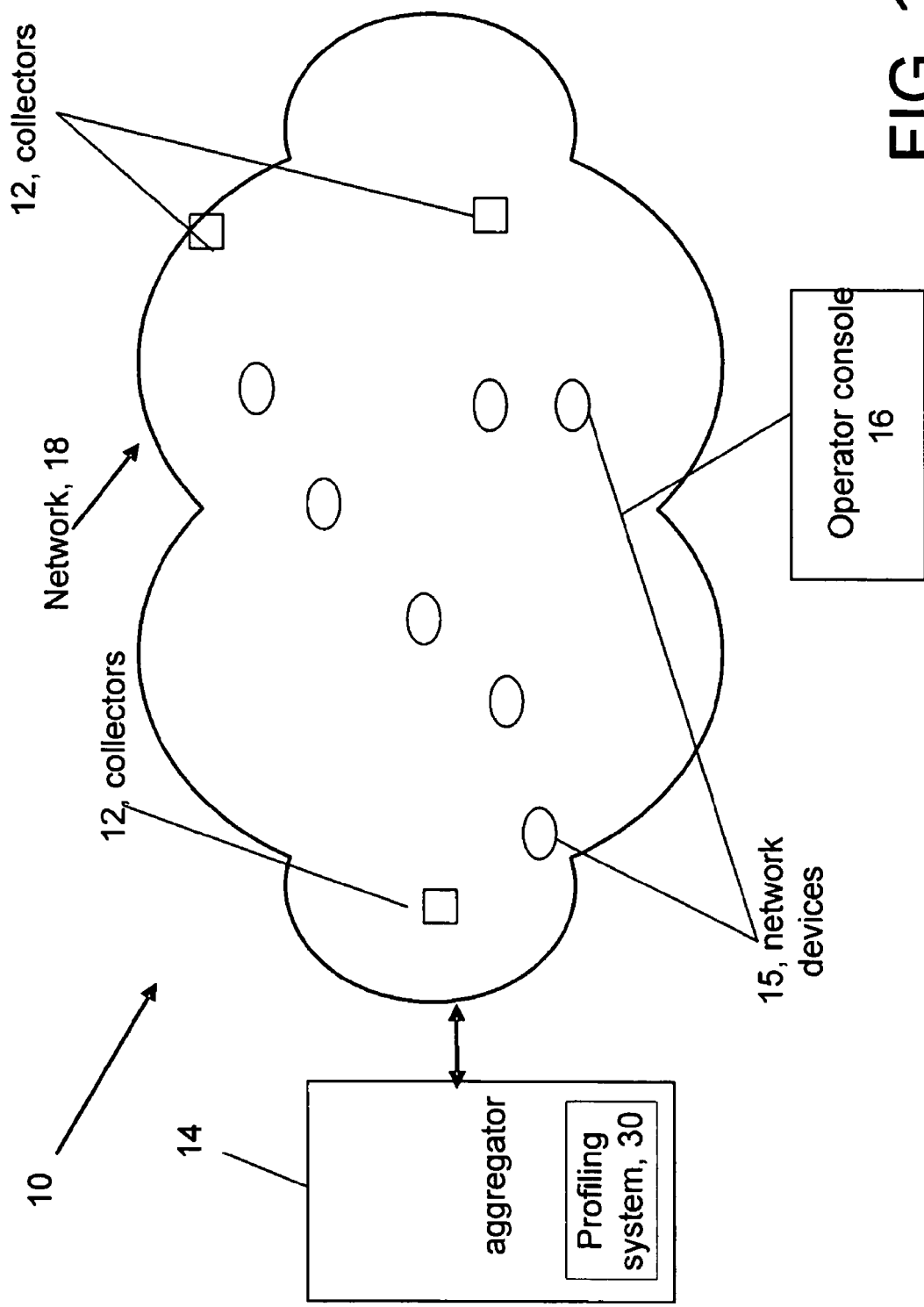
FIG. 1 is a block diagram of a network including anomaly detection.

Referring to FIG. 1, an anomaly detection and worm propagation mitigation system 10 to detect anomalies and process anomalies into events is shown. The system 10 detects denial of service attacks (DoS attacks), unauthorized access attempts, scanning attacks, worm propagation, network failures, and addition of new hosts in a network 18 and so forth. The system 10 includes flow collector devices 12, at least one aggregator device 14, and an operator console 16 that communicates with and can control collector devices 12 and the aggregator device 14. The flow collector devices 12 and the aggregator 14 are disposed in the network 18. The aggregator device 14 includes a profiling system 30 (system 30) to analyze data collected by collector devices 12 to identify potential worms. The system profiles characteristics of the packets. The flow collector devices 12 connect to network devices 15 e.g., switches, hosts, routers, etc. in line, or via a tap, e.g., using mirror, SPAN ports or other passive link taps.

In some embodiments, the flow collector devices 12 collect information such as packet payload data, source and destination addresses, transport protocol, source and destination ports, flags, and length. The flow collectors 12 periodically send information to the aggregator 14 allowing the aggregator 14 to analyze and store the data from collectors 12 in a memory. The flow collector devices 12 also collect connection information to identify host connection pairs.

Figure 2A:
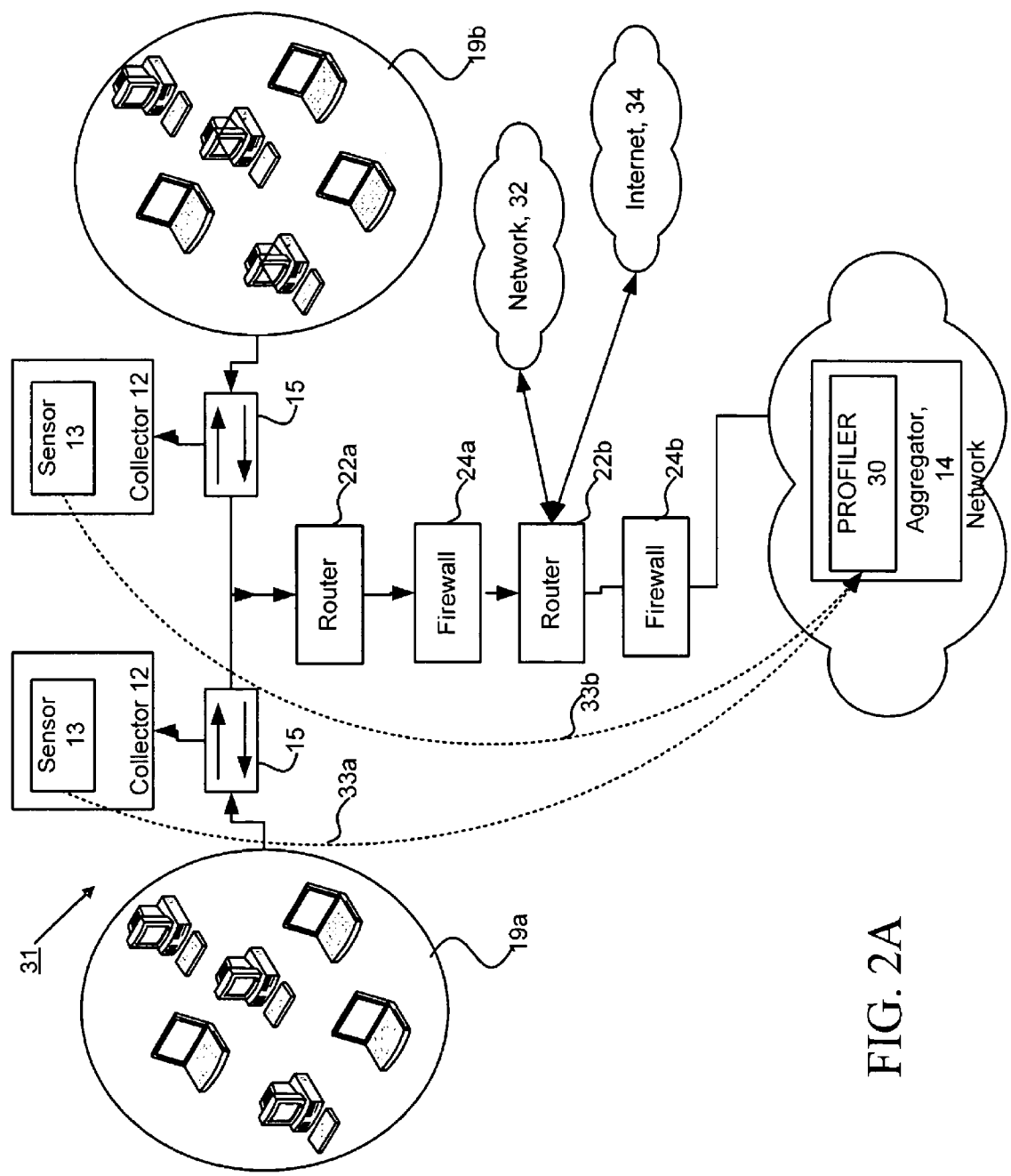
FIG. 2A is a block diagram depicting exemplary details of a worm detection system.

Referring to FIG. 2A, an exemplary network 31 including an anomaly detection system is shown. In the network 31, flow collector devices 12 are disposed to sample or collect information from network devices 15, e.g., switches, as shown. The flow collectors 12 include sensors 13 that sample packets sent between the network devices 15 and analyze packet payload data. The flow collector devices 12 send flow data information and payload information to the aggregator 14 and system 30 over the network (as represented by arrows 33a and 33b). In some configurations the collectors 12 sample all traffic from a downstream network 19a provided that the traffic traverses the switches 15, whereas in some additional configurations the collectors 12 sample traffic from downstream network 19b that enters and leaves the switches 15. The data collectors 12 are devices that are coupled actively or passively on a link and collect the above-mentioned flow data. Data collectors 12 are connected via a tap or can span a port on a monitored device (e.g., router, etc.) over intervals of time.

Flow records are established from flow data received from the collectors 12. The flow records represent individual flows. The aggregator 14 includes a system 30 that analyzes the packet payloads to determine if the packet is a packet generated by a worm (as described below). In addition, the aggregator uses these flow records to generate a connection table that stores statistical data such as bytes/second, packets/second, connections/hour statistics, and so forth over various periods of time. Such data allows aggregator 14 to compare current data to historical data. The comparison data can be used by the aggregator 14 to confirm the presence of a worm, as described below.

Over pre-determined intervals of time, e.g., every 30 seconds, the data collectors 12 send flow records and payload information to the aggregator 14 and system 30. The flow records are sent from the collectors 12 to the aggregator 14 over the network being monitored or over a hardened network (not shown). Preferably, the flow records are sent using a reliable protocol such as "Mazu System Control Protocol" "MPCP" or other reliable protocols, e.g., those such as Transmission Control Protocol (TCP) or those built on TCP to insure either delivery of all flow records or indication of missing records.

There are a defined number of sources, a defined number of destinations, and a defined number of protocols on a given network. Over a defined interval (e.g., 30 seconds), the data collectors 12 monitor all connections between all pairs of hosts and destinations using any of the defined protocols.

Figure 2B:
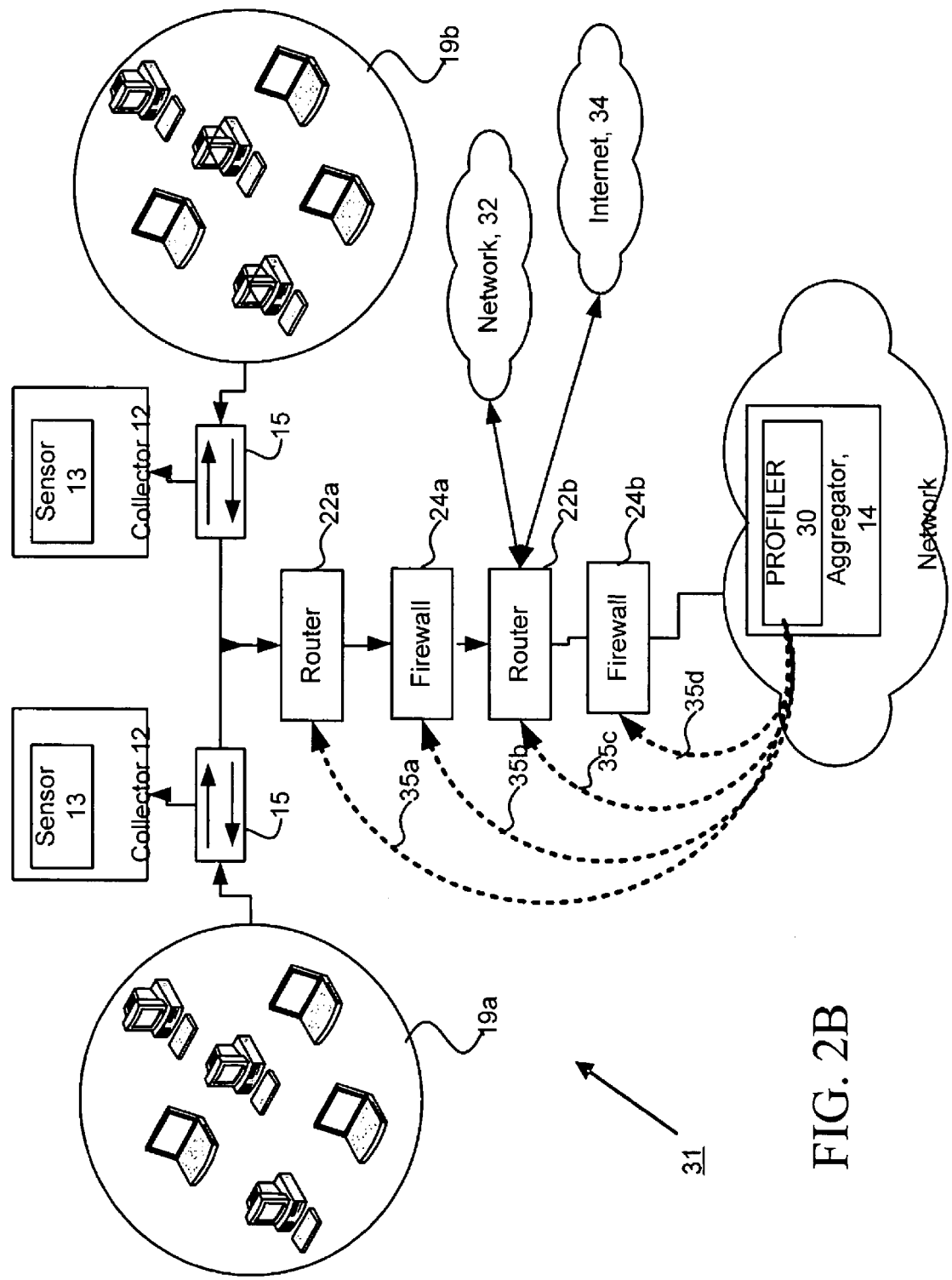
FIG. 2B is a block diagram depicting exemplary details of a worm signature distribution system.

The aggregator 14 and system 30 use the information about the data flow and payload information received from the collectors 12 to detect anomalies and to determine the existence of packets associated with the propagation of a worm within the network 31. In general, packets that are propagating worm packets include a signature (e.g., a particular combination of bits) in the payload of the packet. The system 30 analyzes the packet payload information to detect such signatures that could be associated with a worm propagating in the network (as described below). When the system 30 identifies a signature, the system 30 publishes the signature to routers 22, switches 15, and firewalls 24 (e.g. as indicated by arrows 35a, 35b, 35c, and 35d in FIG. 2B) to mitigate the propagation of the worm. Based on the received signature, the routers 22, switches 15, and firewalls 24 filter packets (e.g., blackhole or drop the packets) that include the identified signature to mitigate the spread of the worm.

Figure 3:
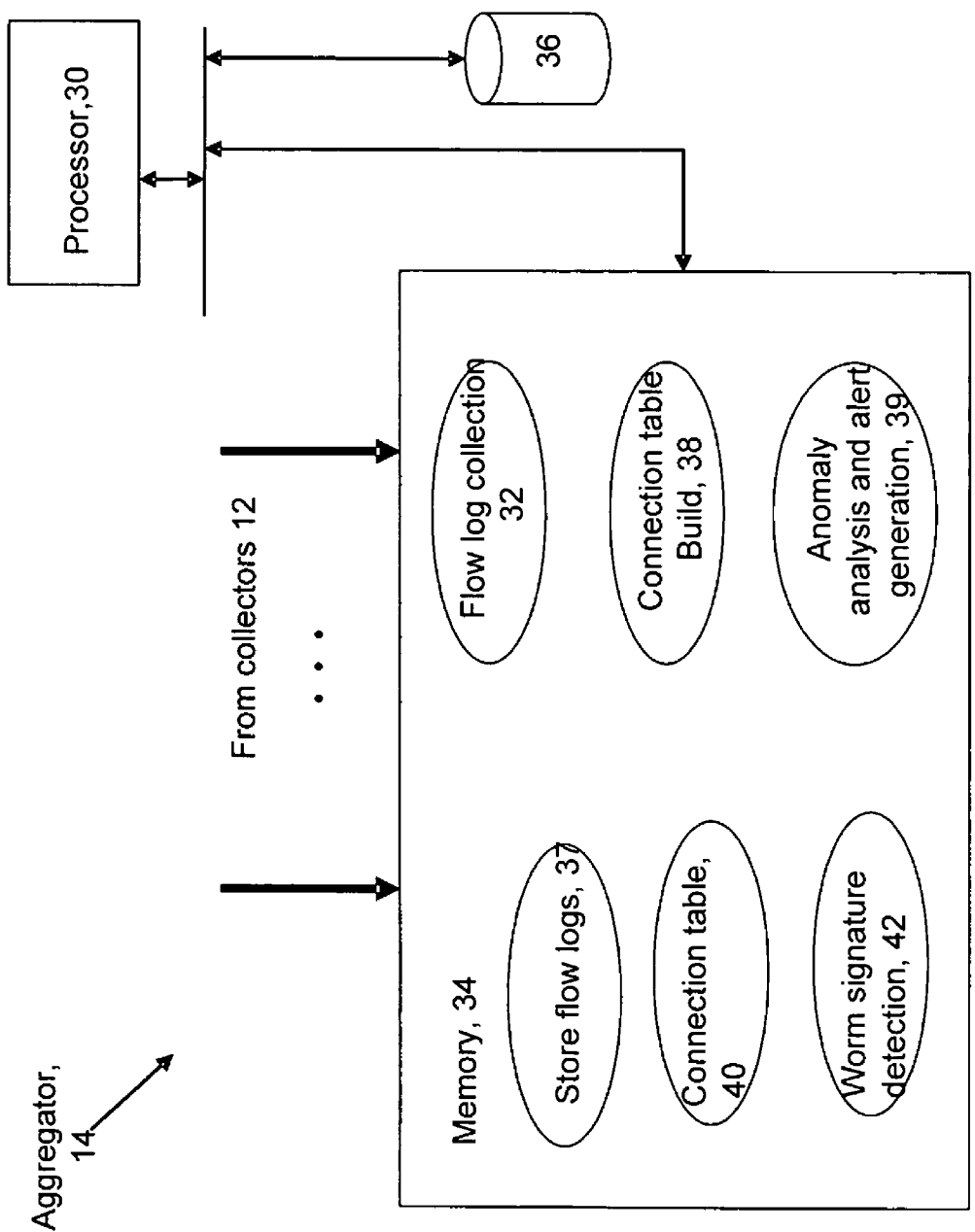
FIG. 3 is a block diagram depicting an aggregator.

Referring to FIG. 3, the aggregator 14 is a device (a general depiction of a general purpose computing device is shown) that includes a processor 30, memory 34, and storage 36. Other implementations such as Application Specific Integrated Circuits are possible. The aggregator 14 includes processes 32 to collect flow data from flow collectors 12 or sensors 15, processes 37 to store flow records, and processes 38 to produce a connection table 40 from the flow data or flow records. The aggregator 14 also includes a worm signature detection and distribution process 42 that uses the flow data collected by processes 36 to analyze packet payload information and determine if the packet was generated by a worm propagating in the network. If the packet was generated by a worm, worm signature detection process 42 determines the worm signature from the analyzed packet payload information, formats the signature, and delivers the signature to other devices in communication with the aggregator. In some embodiments, the aggregator 14 also includes anomaly analysis and event process 39 that use connection table data and flow records to detect anomalies and process anomalies into events that are reported to the operator console or cause the system 10 to take action in the network 18.

Figure 4:
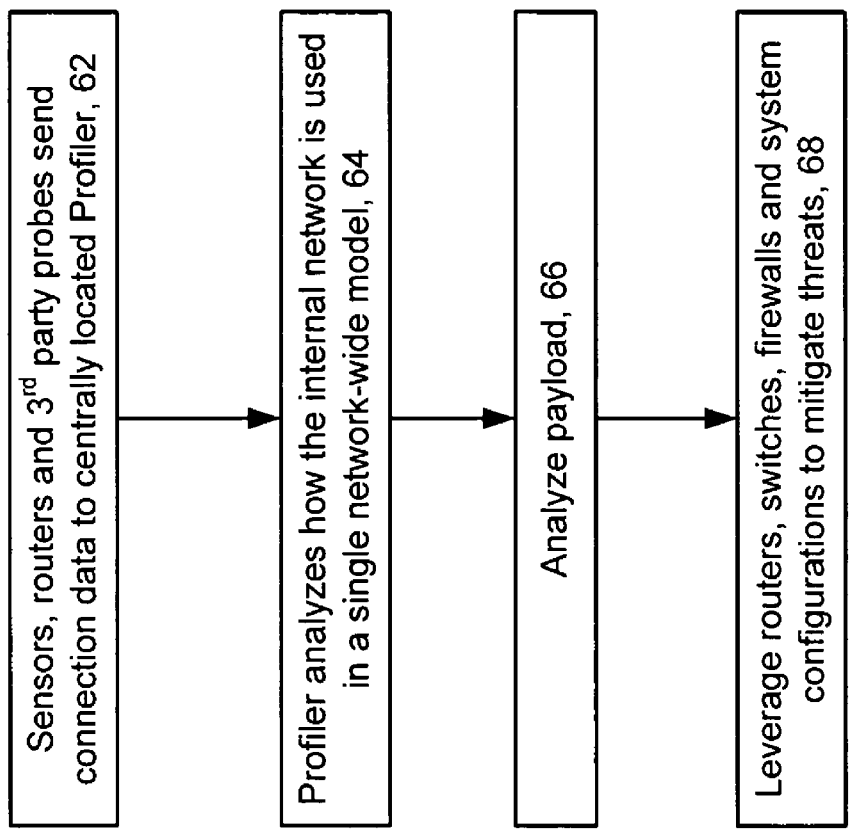
FIG. 4 is a flow chart of a mitigation process.

Referring to FIG. 4, an exemplary signature detection process 42 is shown. Sensors, routers, and other $3^{rd}$ party probes send information to the system 30. The information sent to the system 30 includes packet payload information and connection information related to the flow of packets across the network. After receiving the information from the sensors, routers, and other 3rd party probes, system 30 analyzes 64 how the internal network is used in a network wide model. For example, the system can determine information such as the communication links within the network (e.g., who talks to whom), the Protocol used, the ports used, time indications (e.g., time of day, day of week), amount of traffic, and frequency of the traffic. The system 30 also analyzes 66 the packet payload data from multiple different packets to determine if common patterns exist in the payload data that could indicate the presence of a worm propagating on the network (as described below in relation to FIGS. 5 and 6). Based on the results of analysis 64 and analysis 66, system 30 leverages 68 routers, switches, and firewalls to mitigate threats to the network.

Figure 5:
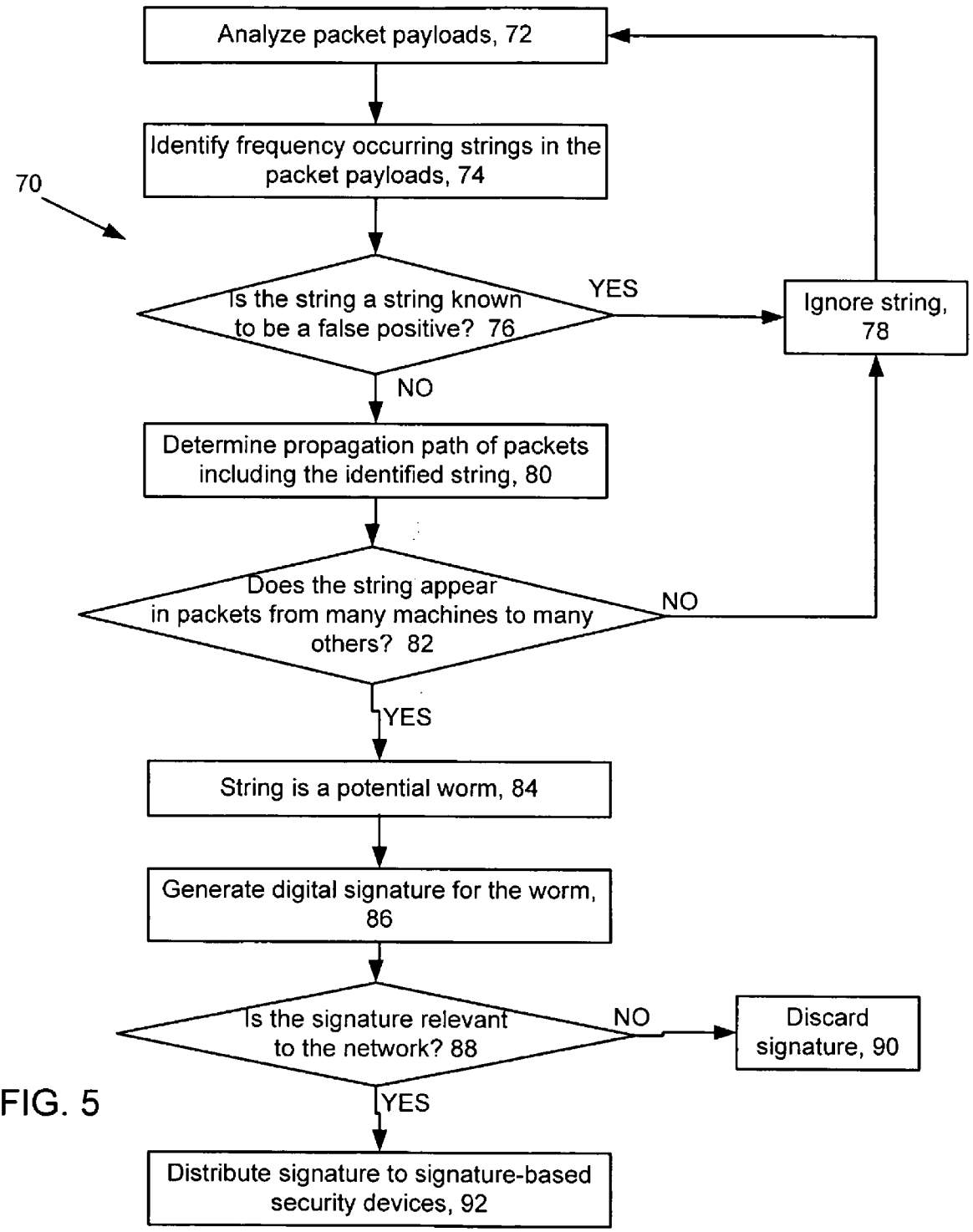
FIG. 5 is a flowchart of a worm detection and signature generation process.

Referring to FIG. 5, a process 70 to determine if a payload includes a signature that indicates that the payload was generated by a worm propagating in the network is shown. The system 30 analyzes 72 the payloads of the packets that are collected by the sensors 15 and identifies 74 frequently occurring strings in the packet payloads. In general, a worm generates a signature such as a byte pattern in the packet payload that recurs for all renditions of the worm. Based on the recurring byte patterns, the system 30 analyzes the prevalence of recurring patterns of bits in payloads from multiple packets that transverse the network and identify potential worms based on the recurrence of a particular byte pattern (e.g., the worm's signature).

Identifying worms based on the prevalence of portions of the packet payload can provide the advantage of requiring no knowledge of the protocol semantics above the TCP level. In general, the content of the packets generated by a worm are often similar because a worm propagates by exploiting one or more vulnerabilities in software. The commonality in functionality of the worm results in a commonality in code and therefore in payload content for the worm. In some examples, the content of the entire payload remains constant for a worm while the worm propagates through the network. In other examples, portions of the content of the payload remain constant while other portions change (e.g., in a polymorphic worm). Therefore, identifying a signature based on a repeated portion of the payload can be a useful way to identify worms.

It can be beneficial for the system to generate signatures that exhibit a high sensitivity to the worms (e.g., have a high percentage of true positives when the system correctly identifies a packet generated by a worm as a worm) and a high specificity for selecting only the worm packets (e.g., has a number low false positives where the system identifies a non-worm packet as a worm). In order to decrease the number of false positives, aggregator 14 determines if a recurring portion of a payload is associated with a worm or an innocuous packet. Some recurring portions of the payload in a packet correspond to worm propagation whereas other recurring portions correspond to innocuous packets that include bit patterns that match common patterns that recur in packets transmitted across a network. For example, "GET/index.html HTTP/1.0" is an exemplary common pattern that can recur in a high portion of packets.

When determining if a recurring pattern is a worm signature it is important to disregard such common patterns. In order to disregard such common patterns generated by innocuous traffic, system 30 stores a list of common strings, also referred to as known false positives, and determines 76 if a frequently occurring string identified by the system 30 is included in the list of common strings. If the string is included in the list, then the string is deemed a known false positive and system 30 ignores 78 the string and returns to analyzing packet payloads 72. If the string is not included in the list, then the string may be related to the propagation of a worm.

For strings identified as possible related to propagation of a worm, system 30 determines 80 the propagation paths for packets that include the identified string. The propagation paths are determined based on flow records received from the collectors 12. In addition to a recurring signature, a worm typically generates a relatively high volume of network traffic as it spreads due to the self-propagating nature of worms. Since worms often generate an increased level of traffic, the system 30 determines 82 if the string appears in a high number of packets that are sent from many machines to many other machines. If the string does not occur in a high number of packets, the system 30 ignores 78 the string. If the system determines that the string does occur in a high number of packets, the system identifies 84 the string as a potential worm.

Subsequent to identifying 84 a string as a potential worm, system 30 generates 86 a digital signature for the worm. In general, the digital signature for a worm includes a set of bits/bytes that would be found in a payload of a packet generated by the worm. Such set of bit/bytes are used to generate the signature representative of the worm/. The worm signatures are used by devices such as firewalls and routers to filter packets whose payloads have matching sets of bits/bytes indicating that the packets contain the content string identified as the worm.

After generating the worm signature, the system 30 determines 88 if the signature is relevant to the network. A signature can be relevant the signature is a signature that can actually be used to filter traffic on the specific devices in a network. For example, if the only filtering infrastructure is layer 3 switches, then the system may determine that a payload signature is not relevant. If the system 30 determines 88 that the signature is not relevant, the system 30 discards 90 the signature. If the system 30 determines 88 that the signature is relevant, the system automatically distributes 92 the signature the various signature based security devices such as firewalls and routers.

In some embodiments, the network can include several; different types of signature based security devices. For example, the network can include host based security devices, intrusion protection systems, firewalls, switches, and routers. Various types of security devices can handle signature based mitigation of worms in different manners. For example, the file required and process used for one type of router for the mitigation of a particular worm may be different from the file needed and process used by a different device. Due to the different types of security devices, the signatures and file formats needed to mitigate the propagation of a worm vary among different devices on the network.

Figure 6:
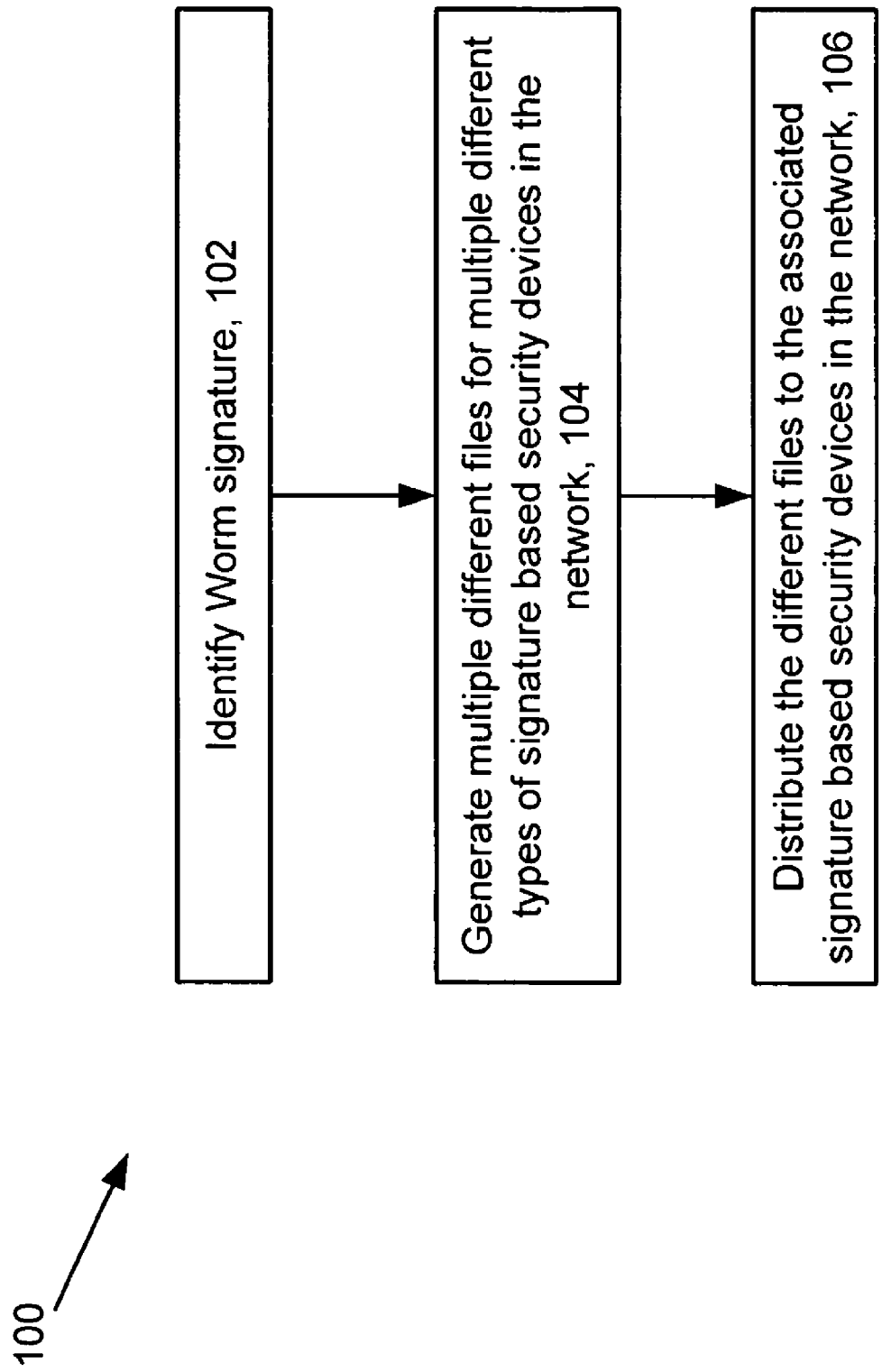
FIG. 6 is a flow chart of a worm signature distribution process.

Referring to FIG. 6, a process 100 for generating and distributing signature based code to various types of security devices is shown. The system 30 receives 102 a worm signature. The signature can be determined as described above or using other signature determination methods. Based on the received signature, system 30 generates 104 multiple, different files for different types of signature based security devices in the network. In order to generate the appropriate files, system 30 uses stored information related to the format and information necessary for each type of device to use the signature. System 30 automatically generates these file using the information stored in the system 30 for the various devices and the relevant worm signature. By automatically generating the files the system can reduce the time needed to generate the files thus hastening delivery of the signature to the various devices. System 30 distributes 106 the generated signatures to the various security devices. Generating and sending device specific signature files to the various security devices can provide the advantage of allowing the devices to receive and use the worm signatures without having to install additional, proprietary software onto the device.

Detecting Exploit-Based Worms

In general, the spread of a worm can be reduced or halted by automatic detection and characterization of the worm by finding its 'signature.' A signature is a sequence of bytes in the packet payload that uniquely characterizes the worm. The signature can be used in conjunction with filters deployed on existing firewalls or IDS systems to stop or reduce the spread of the worm.

Figure 7:
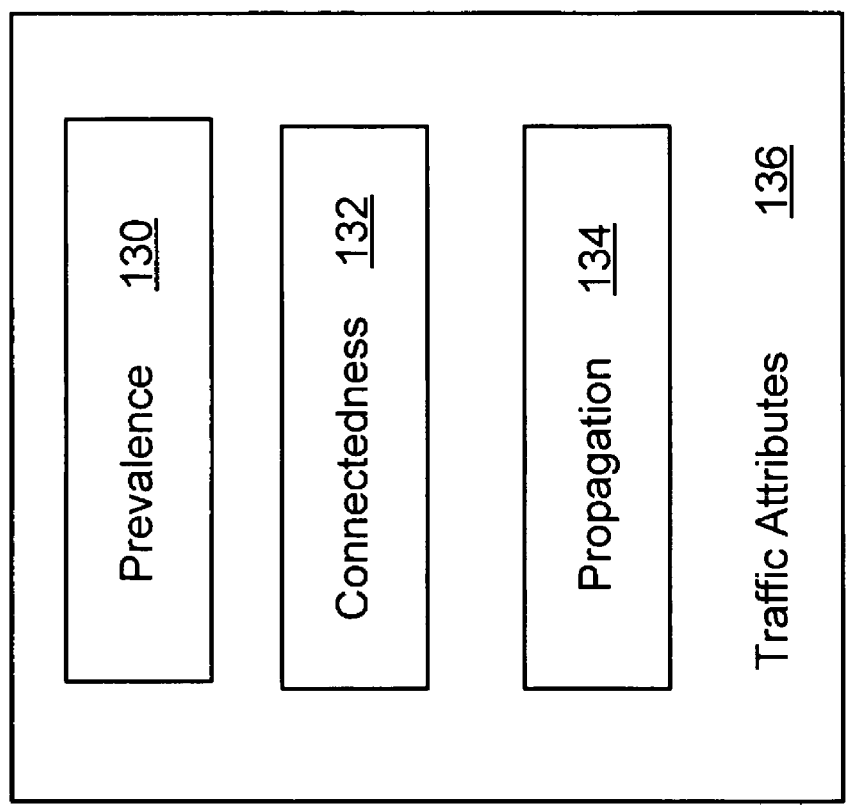
FIG. 7 is a block diagram of traffic attributes.

As shown in FIG. 7, traffic attributes 136 such as content prevalence 130, connectedness 132, and propagation 134 are used to detect the presence of an exploit-based worm. Use of such traffic attributes 135 combines properties fundamental to most kind of worms, such as the recurring payload or signature, with other properties associated with how a worm spreads or how the worm is activated on a victim machine.

Content prevalence 130 refers to the number of times a signature is observed in traffic during a given time interval. The prevalence is based on the recurring nature of an invariant portion of a worm's content. This invariant portion occurs frequently when the worm is propagating in a network. In order to detect the spread of an exploit-based worm, the information about content prevalence 130 is combined with other fundamental properties of most exploit-based worms, namely connectedness 132 and propagation 134. It is believed that using a combination of content prevalence 130, connectedness 132, and propagation 134 can result in high accuracy or sensitivity in detection of worms and low percentage of false positives. In some embodiments, the low percentage of false positives eliminates the need for signature white-lists. In general, a white-list is a list of signatures related to false positives that the system excludes from being classified and treated as worms.

Connectedness 132 refers to the situation when a signature is observed propagating from a client to more than a predetermined number of destinations (e.g., 4 destinations, 5 destinations, 6 destinations, 7 destinations, etc.). This predetermined number of destinations can be referred to as a 'server threshold' and relates to the number of servers on the same destination port. If more than a 'connectedness threshold' percent (e.g., from about 70% to about 90%, from about 75% to about 85%, about 75%, about 80%, about 85%) of clients associated with a particular signature exceed the server threshold, the signature exhibits connectedness. In order to account for unsuccessful connection attempts over which a signature may not be seen, the system also includes those servers to which unsuccessful connection attempts were made.

Propagation 134 refers to the situation when a signature is seen propagating from a client to a server, and then again from the server (which acts as a client) to another server on the same destination port. If such a forwarding nature is observed, the signature is said to exhibit propagation.

Signatures may exhibit those properties that are dependent on the type of service. For instance, HTTP does not exhibit propagation, because an HTTP server is usually not the client of another HTTP server. Hence signatures are not expected on HTTP traffic that show propagation. In general, worms and peer-to-peer traffic show high connectedness and propagation. In contrast, most commonly-used services (e.g., SMB, HTTP, NetBIOS) show either high connectedness or propagation, but not both. For instance, client-server traffic exhibits low propagation but may at times show high connectedness (e.g. HTTP) because servers are typically not also clients. Peer-to-peer applications show high propagation but low connectedness because servers are typically also clients. In general, peer-to-peer traffic shows low signature prevalence. Thus, the combination of content prevalence 130, connectedness 132, and propagation 134 can be used to identify worms.

In general, the exploit-based worm detection heuristic identifies worm signatures by detecting prevalent strings found in traffic that exhibits high connectedness and propagation.

Figure 8:
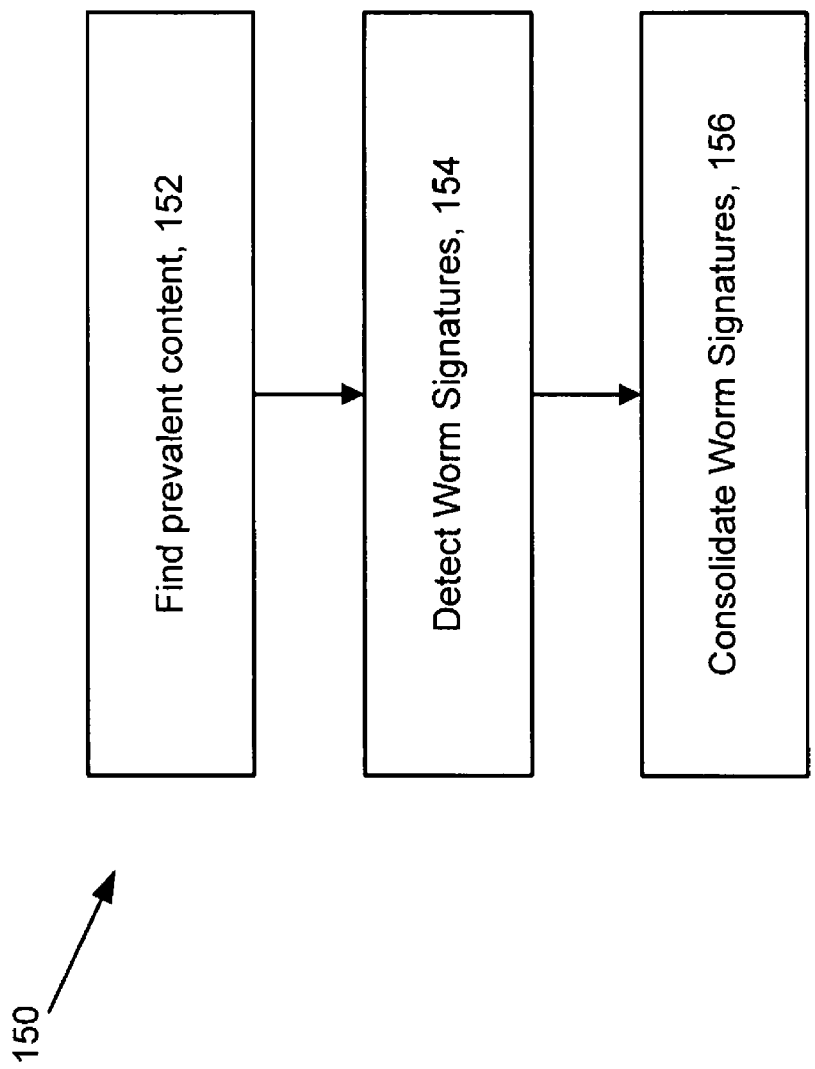
FIG. 8 is a flow chart of a worm detection process.

Referring to FIG. 8, a worm detection process includes finding (152) prevalent signatures, detecting (154) worm signatures from the prevalent signatures, and consolidating (156) the worm signatures.

Figure 9:
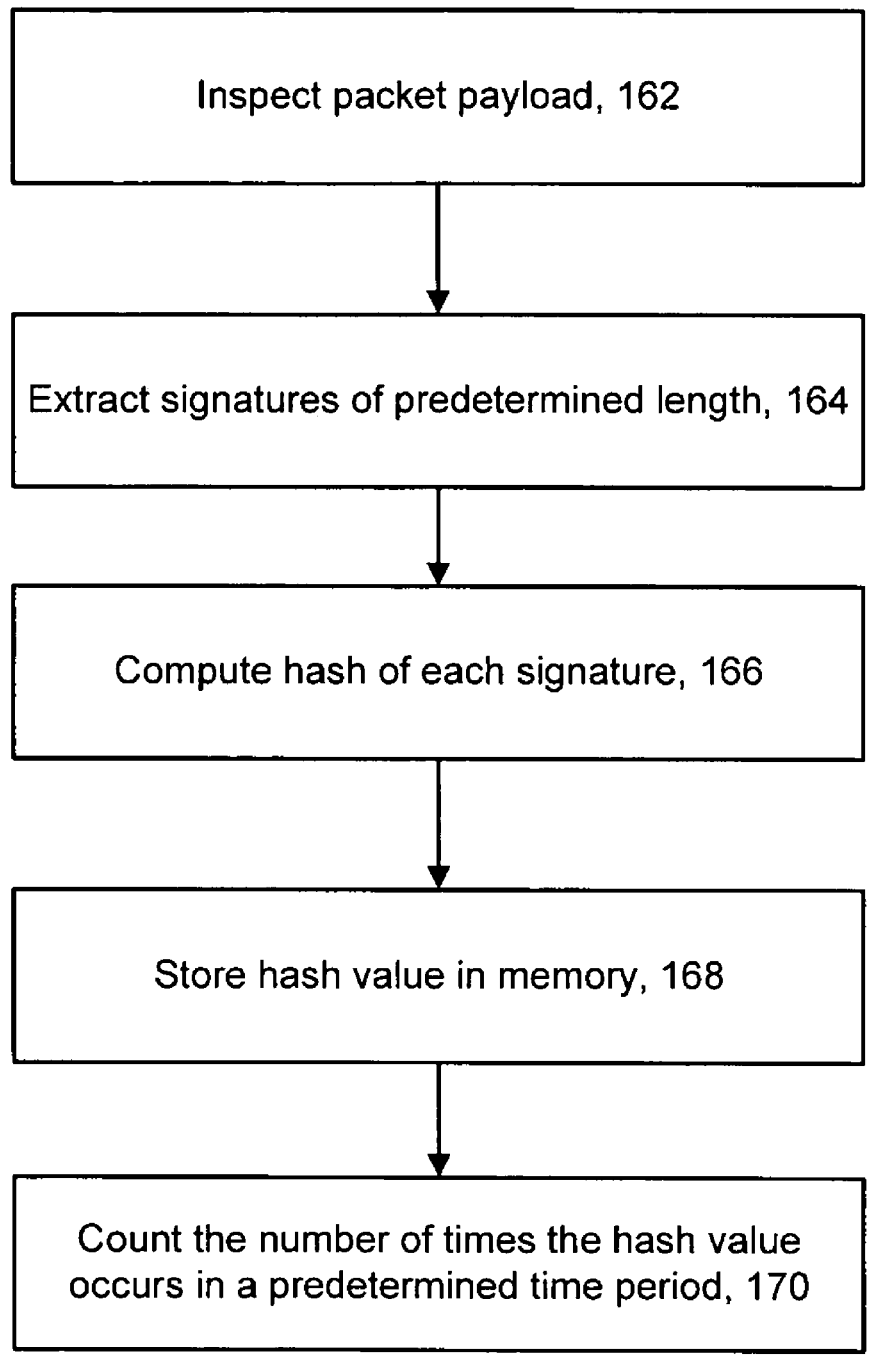
FIG. 9 is a flow chart of a signature detection process.

Referring to FIG. 9 a process 160 for finding prevalent signatures is conducted by a worm detection system. The worm detection system inspects (162) the payload of the IP packets. The sampling can depend on the performance of the forwarding path and the speed of the network cards. The system extracts (164) signatures of a predetermined length (e.g., a predetermined number of bytes). For example, the system can start from a byte offset 0 of the payload (e.g., a TCP or UDP payload) and extract signatures of a length 's' bytes. Thus, a payload of N bytes has N-s+1 signatures.

In order to store and process the signatures, the system computes (166) a hash of the signatures. This hash value is called the 'fingerprint.' In some embodiments, Rabin's fingerprinting method can be used to compute and store incremental 64-bit fingerprints in a packet payload. An example of Rabbin's fingerprinting method is disclosed in M. O. Rabin, Fingerprinting by Random Polynomials. Technical Report 15-18, Center for Research in Computing Technology, Harvard University, 1981.

The fingerprints are stored (168) in e.g., memory and are sampled based on their value. The sampled fingerprints are stored in memory for a short period of time, for example from about one to about five minutes. The prevalence of the signatures is measured by counting (170) the number of times the signature occurs in traffic. A threshold value is used to determine if the signature is prevalent (e.g., if the signature has been observed more times than the threshold). For example, the threshold number of times the signature occurs in traffic can be from about six to about ten times.

Subsequent to detecting prevalent payloads or signatures from the payloads of received packets, the system processes the received payloads and information about the packets to detect worm signatures.

Figure 10:
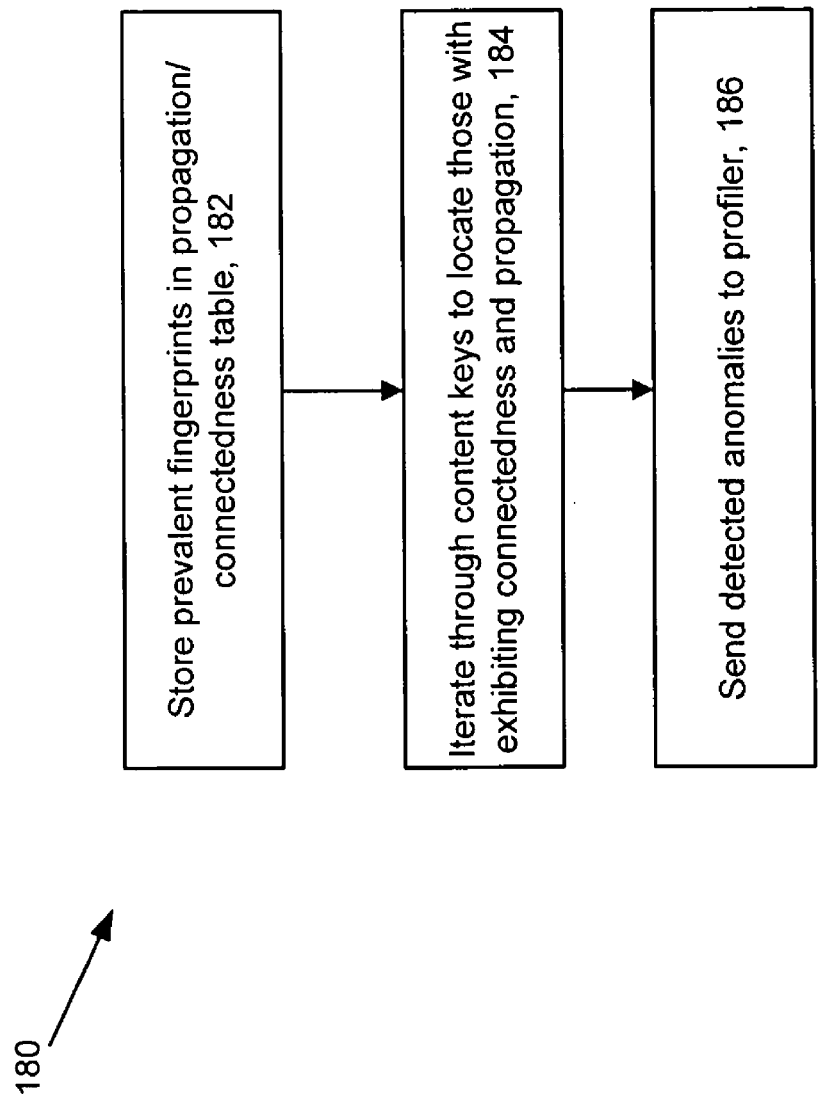
FIG. 10 is a flow chart of an anomaly detection process.

Referring to FIG. 10 a process 180 for detecting worm signatures from the prevalent packet payloads includes storing (182) the prevalent fingerprints in a data structure 'propagation/connectedness table' (PC table). The PC table includes propagation and connectedness information for the specific fingerprint. The PC table resides in memory for a few hours. The amount of memory used is dependent on the type of traffic. For example, it is estimated that signatures of length 40 bytes, with a prevalence threshold of "eight" can be held in a memory of 2 GB, for about two to three hours.

The PC table is implemented as a hash map where the key is a tuple of the prevalent fingerprint and the destination port of the IP packet. This tuple is referred to as the 'content key.' The source port is not stored in the PC table because a worm's infection attempts may use arbitrary client ports, limiting the relevance of the source port to the analysis. The system iterates (184) through the content keys to determine the content keys for which the PC trees exhibit both connectedness and propagation (as described below).

The system can iterate through the content keys over predetermined time intervals, e.g., every minute, every thirty seconds, every two minutes, etc. The signatures that exhibit both connectedness and propagation are classified as worm signature anomalies. The system sends (186) these anomalies, if any, to the System. The PC tree can be flushed or cleared periodically to free the memory space used to store the information. For example, the PC tree can be flushed every hour, every few hours, or when a memory limit is exceeded.

Figure 11:
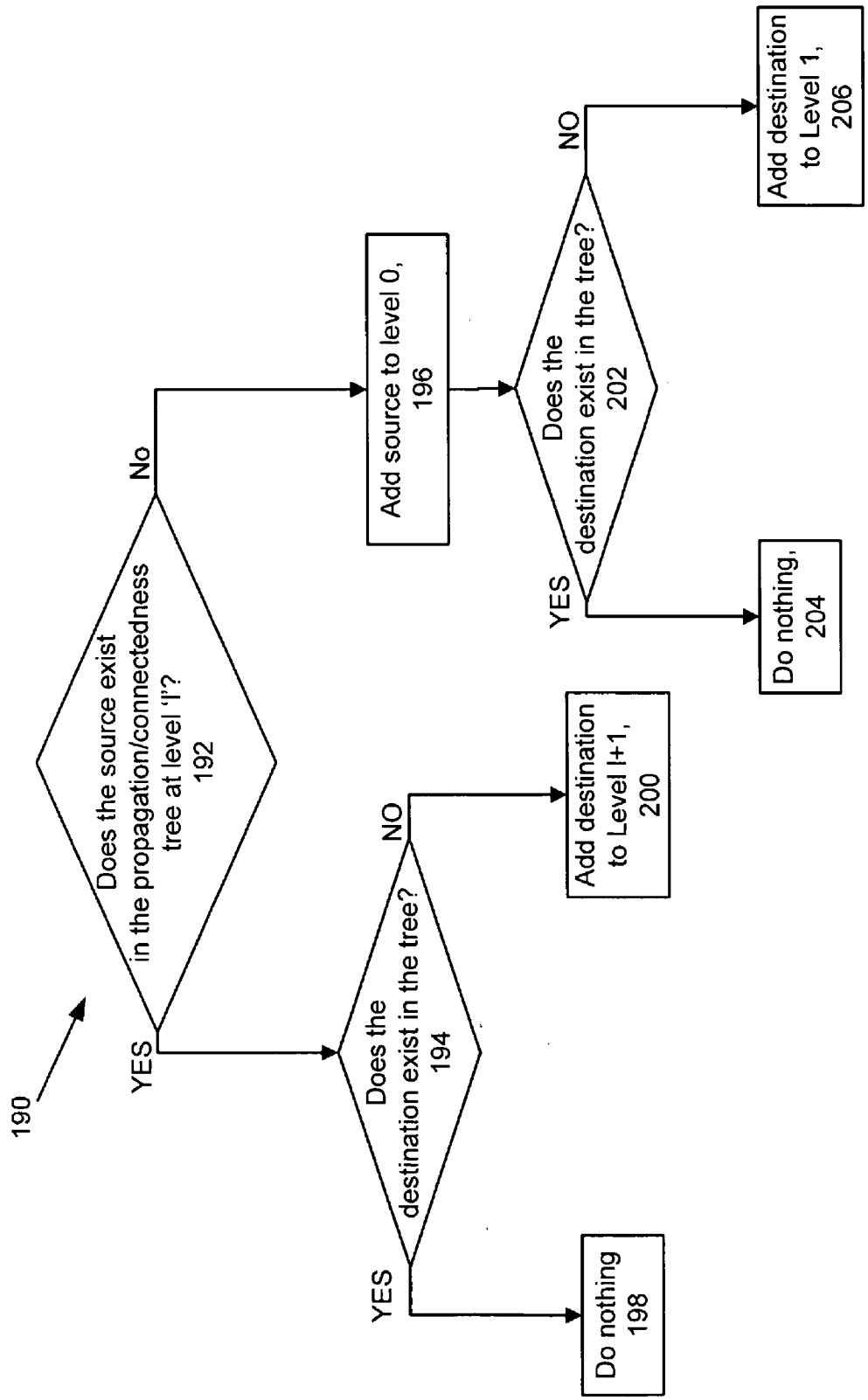
FIG. 11 is a flow chart of a tree generation process.

Referring to FIG. 11, a process 190 for generating a PC tree is shown. The PC tree is used by the system to determine if a set of packets whose IP payload includes the same fingerprint exhibits propagation is shown. The PC tree records propagation of packets whose IP payload includes the same fingerprint. Each node in the tree is a level in the propagation, starting with root node at level 0. The root node includes the set of original sources of the propagation. Each host is recorded at a level that the host was first seen to be infected.

For each packet including the signature associates with a particular PC tree, the system determines (192) if the source of the packet exists in the PC table associated with the signature.

If the source exists at any level 'l' in the PC table, the system does not add the source to the PC table. The system determines (194) if the destination exists in the PC tree. If the destination exists in the PC tree, the system does nothing (198) and makes no additions or changes to the PC tree. On the other hand, if the destination address does not exist in the PC tree, the system adds (200) the destination to the level subsequent to the source (e.g., level l+1).

If the system determines (192) that the source does not exist in the PC tree, the system adds (196) the source to the PC tree at level 0 and determines (202) if the destination exists in the PC tree. If the destination exists in the PC tree, the system does nothing (204). If, on the other hand, the destination does not exist in the PC tree, the system adds (206) the destination to the first level of the PC tree (level 1).

Exemplary pseudo code representing the process for generating the PC tree is shown below:

```
For a given packet with src s, dst d
    if (s exists in Tree at level l)
        if (d exists in Tree)
            do nothing
        else
            add d to level l+1
    else
        add s to level 0
        if (s exists in Tree)
            do nothing
        else
            add d to level 1
```

For example, a PC tree can be generated for packets observed with the same signature among network among hosts A, B, C, D, and E. If the received packets include a first packet from source E to destination C, a second packet from source A to destination B, a third packet from source B to destination D, a fourth packet from source D to destination C, a fifth packet from source C to destination B, the resulting structure would be:

E A (level 0)
C B (level 1)
D (level 2)

Each level in the PC tree describes the set of possibly infected hosts, at least one of which is involved in propagation to the next level. In order to determine if a particular PC tree exhibits propagation, the system uses a depth threshold and a breadth threshold. The depth threshold relates to the number of levels in the PC tree and the breadth threshold relates to the number of hosts in each level. In the example discussed above, the depth of the PC tree would be two (the PC tree includes hosts in level 0, level 1, and level two), the breadth for level 0 would be two, the breadth for level 1 would be two, and the breadth for level 2 would be one.

When a PC tree exceeds both the 'depth threshold' and the 'breadth threshold', the tree exhibits propagation. The depth threshold can be set as desired. For example, the depth threshold can be two levels, three levels, four levels, etc. The breadth threshold can also be set as desired. For example, the breadth threshold can be two hosts per level, three hosts per level, four hosts per level, five hosts per level, etc. In one particular example, the depth threshold can be two levels and the breadth threshold can be three hosts per level.

As described above, in order to determine if a prevalent signature is associated with a worm, the system determines whether both propagation and connectedness are observed for the signature.

Figure 12:
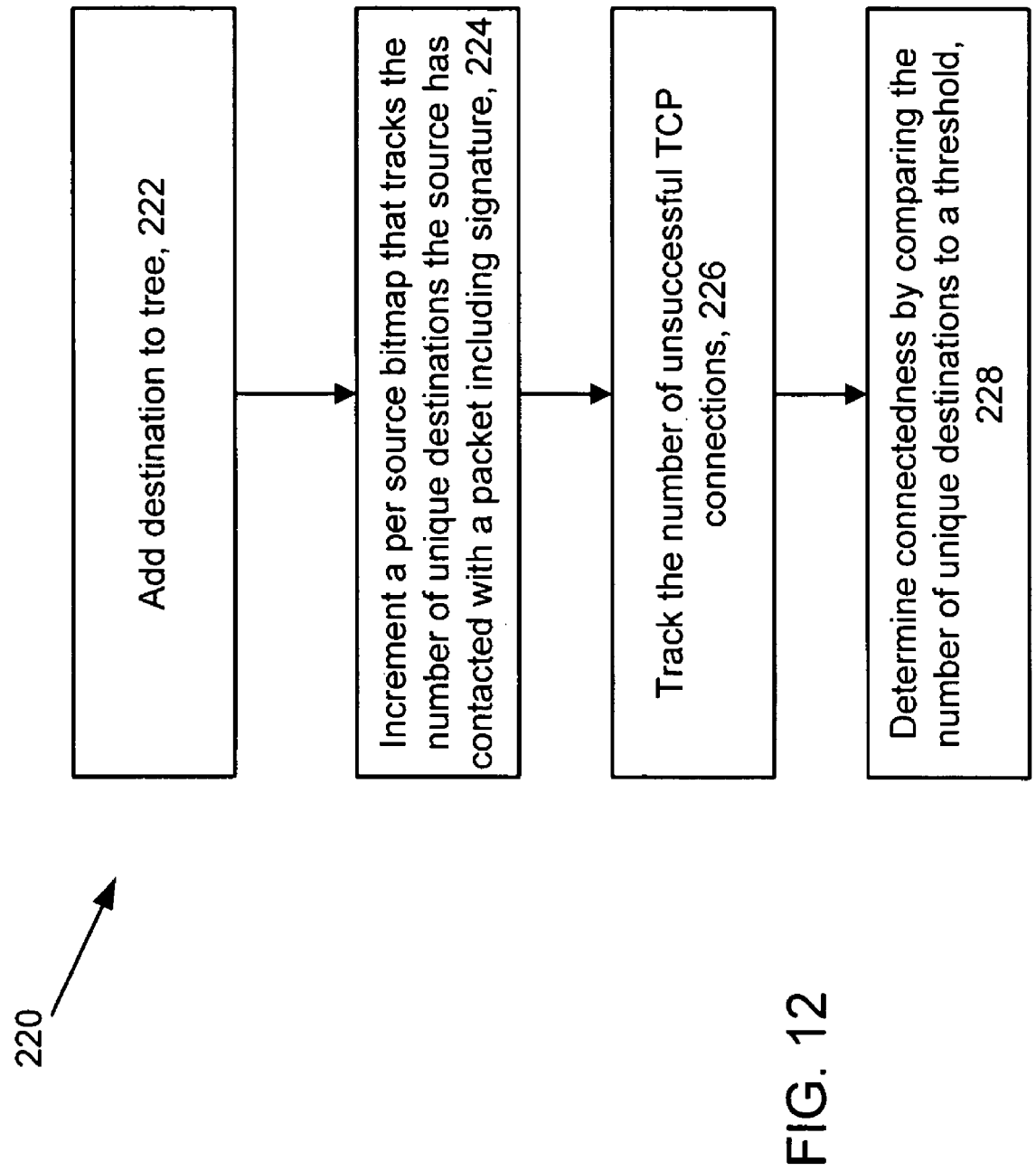
FIG. 12 is a flow chart of a connectedness determination process.

Referring to FIG. 12, a process 220 for determining whether a particular observed signature exhibits connectedness is shown. When the system adds (222) a destination to the PC tree, the system increments (224) a per-source bitmap. The per-source bitmap tracks the number of unique destinations that each source has contacted with a packet that includes the fingerprint. The system also tracks (226) the number of unsuccessful TCP connections for each source. The unsuccessful TCP connections can be tracked using table called 'Unsuccessful TCP connections table' (UT table). The UT table is implemented as a hash map with the source IP address and destination port as the key. The value is a bitmap that counts the number of unique destinations to which unsuccessful connections were made. In some embodiments, due to collisions and the limited size of the bitmap, this number is a minimum.

In the bitmap, for each SYN (synchronization) packet sent from the source, the system sets '1' at the location obtained by hashing the destination IP address into the bitmap. In general a SYN packet is a synchronization packet used in SYN flooding, a method that a user of a hostile client program exploits to conduct a denial-of-service (DOS) attack on a computer server. The hostile client repeatedly sends SYN packets to every port on the server, using spoofed IP addresses. In the bitmap, every time the system encounters a FIN (finish) packet sent from the source, the system sets a value of '0.' A FIN packet is a finish packet used in TCP to indicate the end of a communication. The number of 1's in the bitmap is, therefore, associated with the minimum number of unsuccessful connections attempted by a particular source. The size of the bitmap can be set as desired. For example, using a 64-bit bitmap allows the system to track up to 64 unique destinations.

Using the bitmap, the system compares (228) the number of unique destinations against the server threshold, and compares the number of such sources that exceed server threshold against the connectedness threshold, to determine if the tree exhibits connectedness.

After the worm signatures are detected based on the combination of content prevalence 130, connectedness 132, and propagation 134, the system consolidates the worm signatures.

Figure 13:
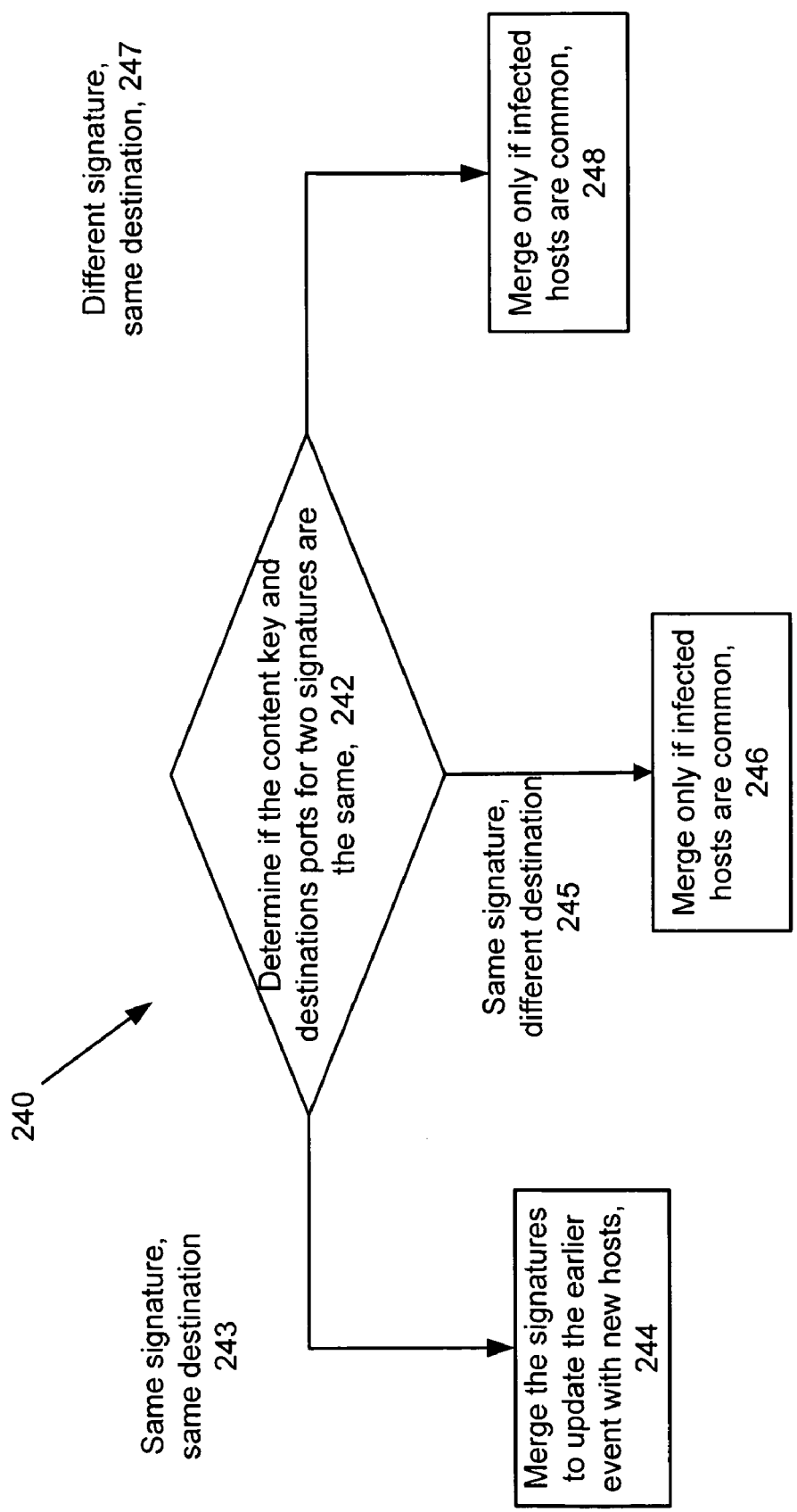
FIG. 13 is a flow chart of a signature consolidation process.

Referring to FIG. 13, for any two detected signatures, the signatures can have the same content key and same destinations (as indicated by arrow 243), the signatures can have the same content key and different destinations (as indicated by arrow 245), or the signatures can have different keys and the same destination (as indicated by arrow 247). If the two signatures, have the same content key (as indicated by arrow 243), the system merges (244) the signatures and updates the earlier event with hosts from a recent interval. This situation typically occurs across different time intervals.

If the two signatures, have the same content key but different destinations (as indicated by arrow 245), the system merges (246) the signatures only if the infected hosts are the same for the two signatures. This can happen either during the same time interval or during different time intervals. An exemplary situation, in which two signatures have the same content key but different destinations, can be when the signatures are generated as the result of a multi-vector worm that uses different exploits but sends the same worm payload to the infected host. Another situation producing such signatures is when two different worms happen to exhibit the same fingerprint. Merging the worm signatures only if most of their infected hosts are common would reduce the likelihood of merging two different worms.

If the two signatures have different content keys, but the same destination, (as indicated by arrow 247) the system merges (248) the signatures only if the infected hosts are common. This situation can occur either during the same time interval or during different time intervals. In general, this situation indicates that both signatures are part of the same worm. For example, they are signatures found at different byte offsets in the same worm payload. Merging the worm signatures only if most of their infected hosts are common would tend to reduce the likelihood of merging two different worms.

Detecting Email-Based Worms

Due to the way in which Email worms propagate, the system detects email worms differently from exploit-based worms. In general, email worms propagate over a logical network of email addresses rather than IP addresses. Treating email-based worms differently than exploit-based worms can reduce false positives from normal, non-worm email traffic.

Normal email traffic exhibits propagation. Incoming mail may hop through more than one mail server before it reaches a client. Additionally, email worms do not always exhibit connectedness at the network layer. They do not depend on an exploit to spread, and hence do not contact other hosts attempting to find potential victims. In addition, email worms typically spread over a logical network of email addresses and not IP addresses.

Referring to FIG. 14, email worms have particular characteristics that are used to detect the spread of the worm. In general, an email-based worm exhibits invariant content across many clients (as shown in block 270). The level of invariant content is typically low for normal mail traffic but high for email worms (as shown in block 271). Email-based worms also generally contact a large number of servers (as shown in block 272). In normal mail traffic the number of servers contacted per client is low compared to the number of servers contacted by an email-based worm (as shown in block 273). Finally, email-based worms often send a large number of the same or similar emails with a high frequency (as shown in block 274). For normal mail traffic, the frequency of similar mails per client is low while the frequency is usually high for email worms (as shown in block 275).

Figure 15:
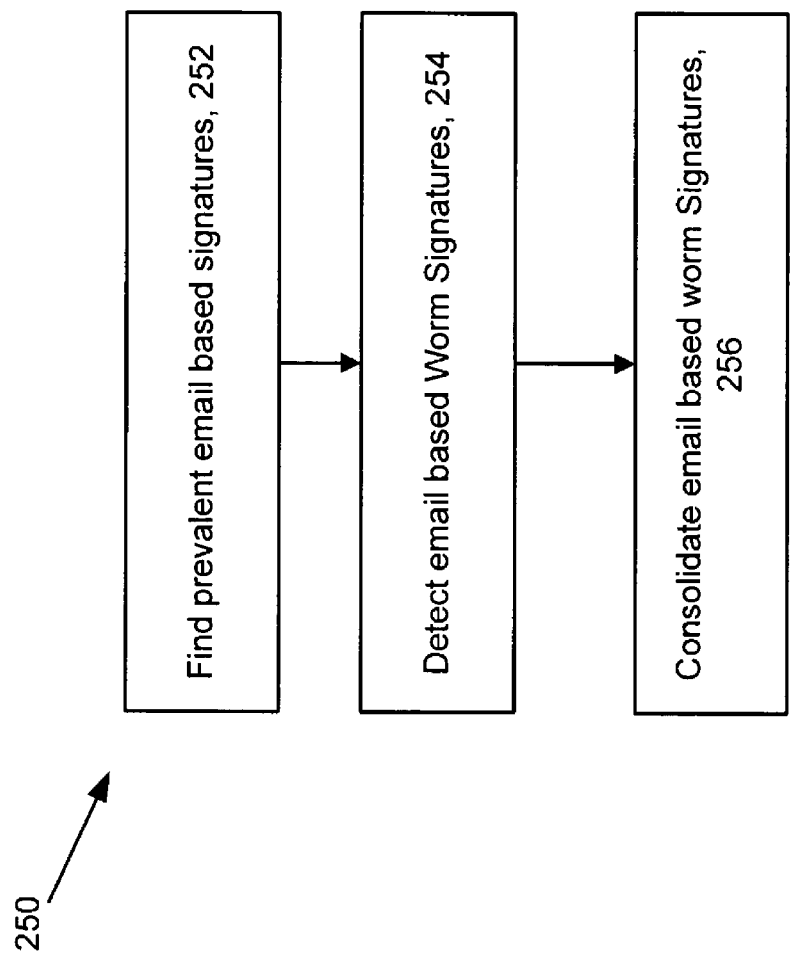
FIG. 15 is a flow chart of an email-based worm detection process.

Referring to FIG. 15, an email-based worm detection process includes finding (252) prevalent email-based signatures. The detection process (252) is similar to the exploit-based worm detection described above. However, since email worms spread more slowly than exploit-based worms, the sampled fingerprints can be stored in a memory for a longer period of time than the exploit-based fingerprints. For example, the fingerprints can be stored for a length of time of 3 hours to 6 hours or more, with about 4 hours being a typical time. Storing the email-based fingerprints for a longer period of time than the exploit-based fingerprints allows the email-based fingerprints to be considered for the prevalence test. In the detection of email-based worms, the only packets processed are those with SMTP (tcp/25) as destination port. Since only packets with SMTP as a destination port are processed the number of input fingerprints is smaller than that for the exploit-based worms.

Figure 16:
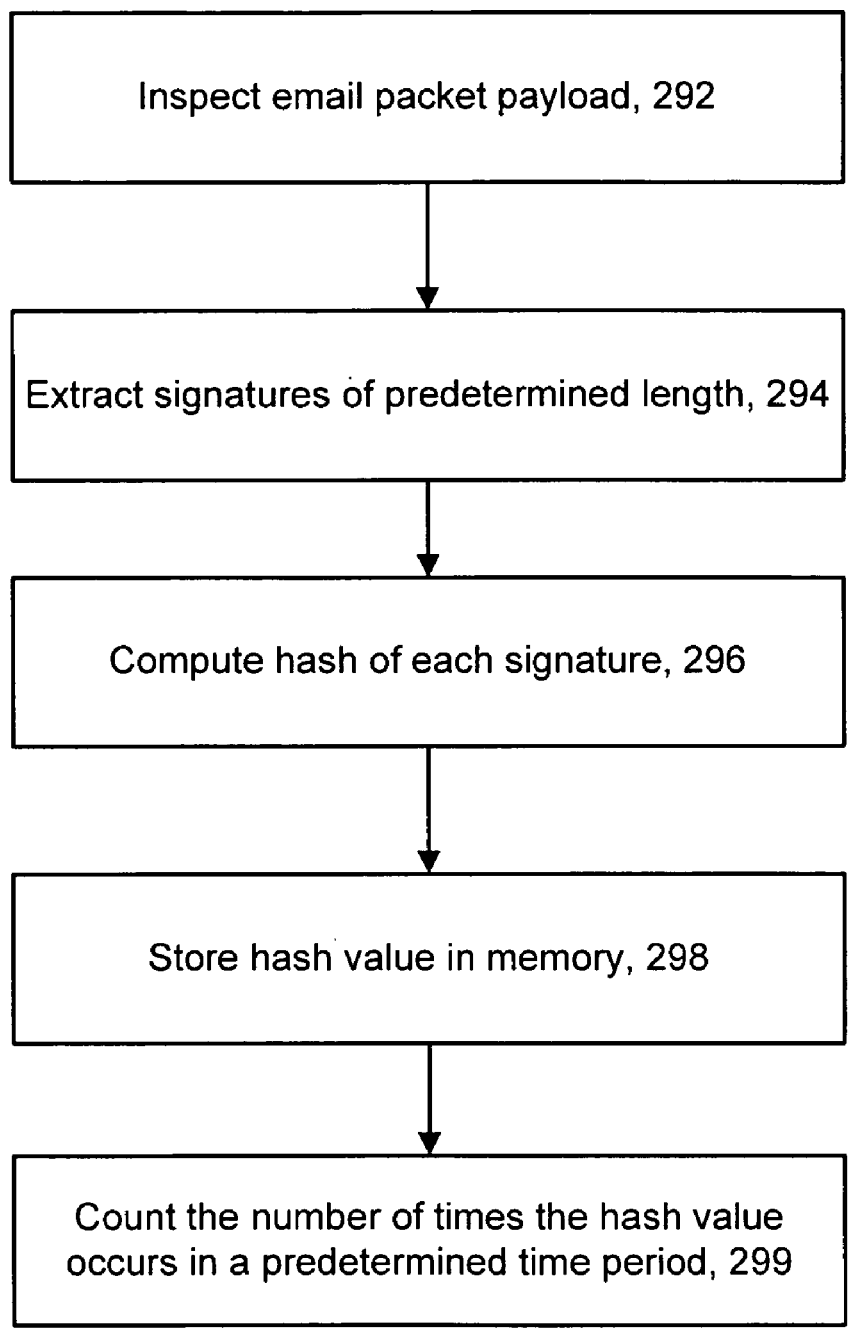
FIG. 16 is a flow chart of a signature detection process.

Referring to FIG. 16 a process 290 for finding prevalent signatures from email-based traffic is conducted by a worm detection system. The worm detection system inspects (292) the payload of the email packets. The system extracts (294) multiple signatures of a predetermined length (e.g., a predetermined number of bytes) from each packet. In order to store and process the signatures, the system computes (296) a hash of the signatures. This hash value is called the 'fingerprint.' The fingerprints are stored (298) in e.g., memory and are sampled based on their value. The sampled fingerprints are stored in memory for about three to six hours. The prevalence of the signatures is measured by counting (299) the number of times the signature occurs in email traffic during a period of time. A threshold value is used to determine if the signature is prevalent (e.g., if the signature has been observed more times than the threshold).

Subsequent to detecting prevalent payloads or signatures from the payloads of received packets, the system processes the received payloads and information about the packets to detect worm signatures.

The email-based worm detection process also includes detecting (254) email-based worm signatures from the prevalent signatures.

Figure 17:
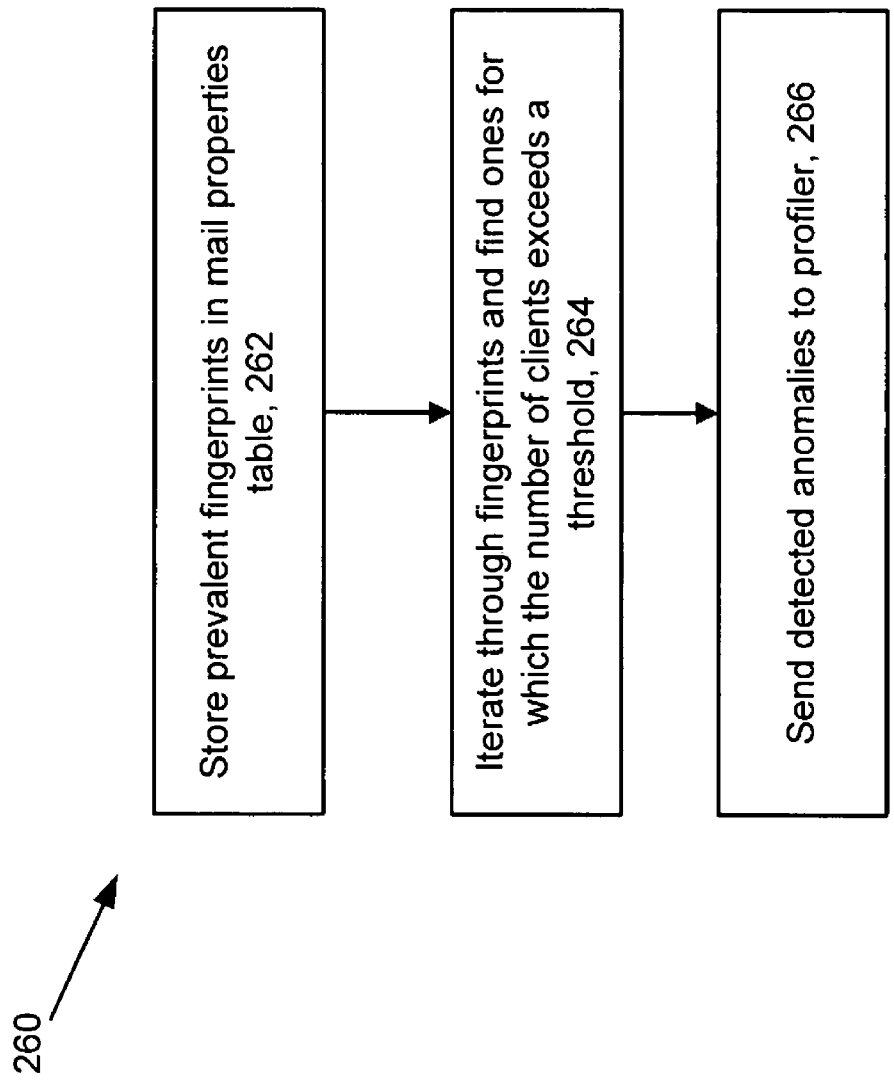
FIG. 17 is a flow chart of an anomaly detection process.

Referring to FIG. 17, a process 260 for detecting the worm signatures from the prevalent signatures is shown. The system stores (262) the prevalent fingerprints in a data structure called the 'Mail Properties Table' (MP table). The MP table is stored in a memory for several hours, which allows the system to detect slowly propagating Email worms. The MP table can be implemented as a hash map where the key is the prevalent fingerprint (note that the destination port is constant) and the value is a 'client list'. A client list is a list of source IP addresses that sent packets with destination port 25, and whose payload included the fingerprint. With each client, the system also stores the number 'n' of distinct SMTP servers contacted by this client and the frequency 'f' of emails sent with the same fingerprint (e.g., expressed as packets per hour). At predetermined time intervals (e.g., every 30 seconds, every minute, every two minutes, every five minutes), the system iterates (264) through the fingerprints and finds the fingerprints for which the number of clients in the client list exceeds a threshold. The threshold is referred to herein as "a number of clients threshold" and is set as desired. For example, the "number of clients threshold" can be set to three clients, four clients, five clients, or six clients.

In addition to meeting the "number of clients threshold," in order for the system to classify the fingerprint as a worm either the average frequency exceeds a 'frequency threshold' or the average number of distinct SMTP servers contacted exceeds a 'number of servers threshold.' The signatures that correspond to these fingerprints are worm signature anomalies. The sensor sends these anomalies, if any, to the system. Periodically the system flushes the MP table when a high memory limit is exceeded or on a regularly occurring time interval.

The average frequency threshold refers to the frequency at which the signature is observed. The frequency can be measured as the number of signatures observed during a particular time period, e.g., an hour, and can be set as desired. For example, the frequency threshold can be about from about eight observations per to about twelve observations per hour. In addition to exceeding the frequency threshold, in order to be classified as a worm the signature should also exhibit a number of clients with frequency greater than a client percent threshold. This threshold can be set as desired. For example, the client percent threshold can be about 60% (e.g., about 50%, about 60%, about 70%).

The 'number of servers threshold' is associated with the average number of distinct SMTP servers contacted. The number of servers threshold can be set as desired. For example, the number of servers threshold can be about five servers (e.g., three servers, four servers, five servers, six servers, seven servers). In addition to exceeding the number of servers threshold, in order to be classified as a worm the signature should exhibit a number of clients with frequency greater than a client percent threshold. This threshold can be set as desired. For example, the client percent threshold can be about 60% (e.g., about 50%, about 60%, about 70%).

The email-based worm detection process also includes consolidating (256) the email-based worm signatures. The consolidation of email-based worm signatures is similar to the consolidation of worm signatures described above for exploit-based worms.

Figure 18:
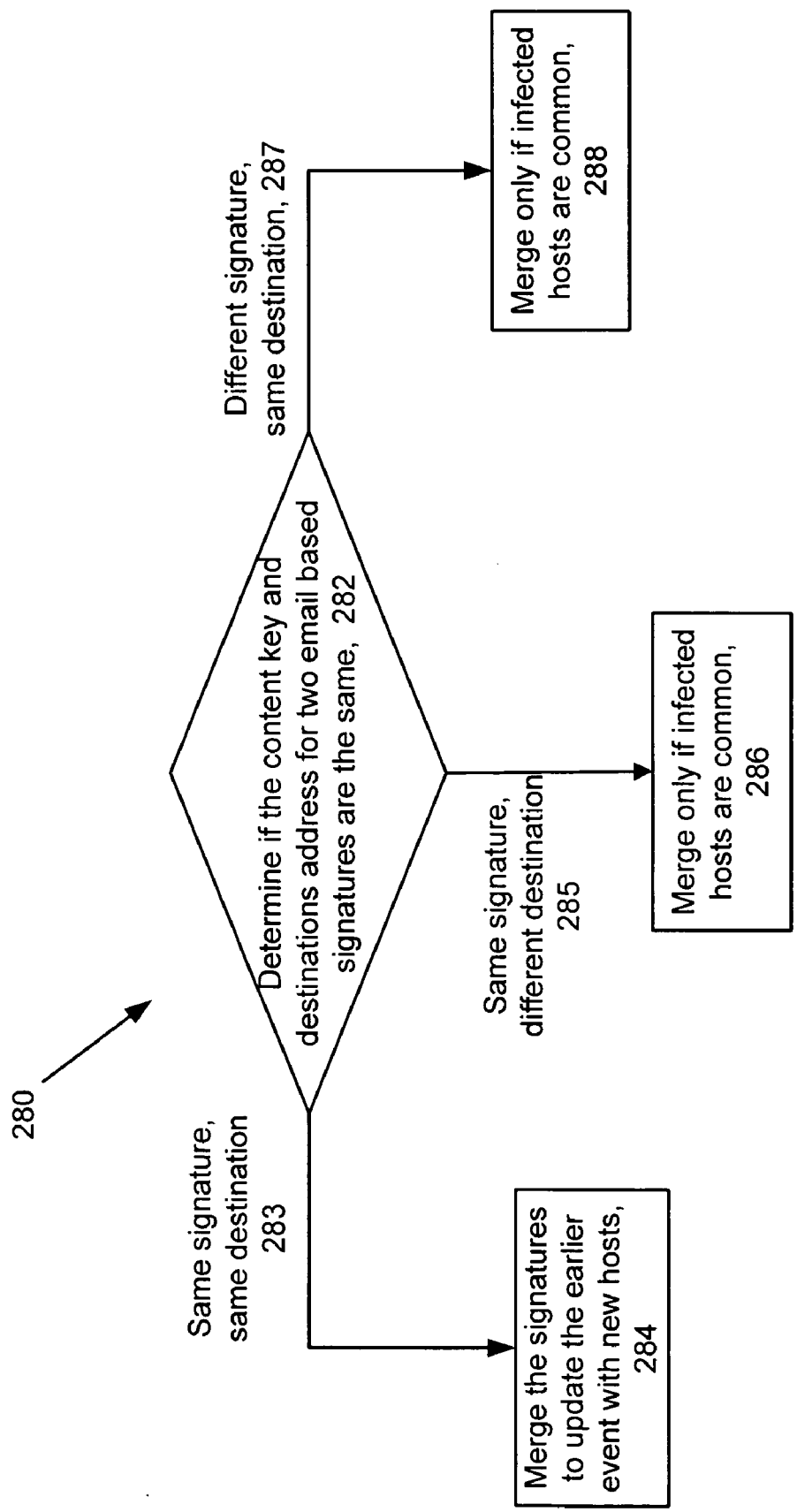
FIG. 18 is a flow chart of a signature consolidation process.

Referring to FIG. 18, for any two detected email signatures, the signatures can have the same content key and same destinations (as indicated by arrow 283), the signatures can have the same content key and different destinations (as indicated by arrow 285), or the signatures can have different keys and the same destination (as indicated by arrow 287). If the two signatures, have the same content key (as indicated by arrow 283), the system merges (284) the signatures and updates the earlier event with hosts from a recent interval. If the two signatures, have the same content key but different destinations (as indicated by arrow 285), the system merges (286) the signatures only if the infected hosts are the same for the two signatures. If the two signatures have different content keys, but the same destination, (as indicated by arrow 287) the system merges (288) the signatures only if the infected hosts are common. Merging the email-based worm signatures only if most of their infected hosts are common would tend to reduce the likelihood of merging two different worms.

In addition to consolidating the email-based worm signatures based on the consolidation process described above, the system also applies additional processes to reduce false positives associated with email-based worms. Signatures from email-based traffic such as traffic associated with spam, carbon copy (CC) lists, and automated mail applications can exhibit high prevalence and are often dispersed across many clients. Thus, if not otherwise accounted for, such mail traffic is likely to generate false positives.

In order to reduce or eliminate false positives associated with incoming spam, the system need not track external clients in the client list. Since the sources of incoming spam are often external hosts, by not tracking such external hosts the number of false positives from incoming spam can be reduced.

In order to reduce or eliminate false positives associated with carbon copy (CC) lists and mailing lists the system does not track mail servers in the client list. Since the source of emails sent to several clients on a CC list or mailing list is typically a mail server, by not tracking such mail servers the number of false positives from CC lists or mailing lists can be reduced.

In order to reduce or eliminate false positives associated with automated mail applications, hosts running the automated mail applications are not tracked in the client list. In general, the automated mail applications periodically send mail messages with similar content, possibly to several mail servers and may run on several clients. Thus, automated mail applications are likely to generate false positive responses based on the detection process described above. By not tracking hosts running the automated mail applications the number of false positives from automated mail applications can be reduced.

Another possible scenario in which content would be repeatedly transmitted is for 'RSVP replies.' RVSP replies are encountered when a single email prompts several clients to reply including the initial mail contents. While the content would include some portions that are identical, the system is unlikely to falsely indicate such replies as worms because the frequency per client is low. The system can also detect 'spam clusters', a group of machines that are remotely controlled to frequently send spam such that the spam is not falsely identified as a worm.

Whenever a new packet causes a content key or a fingerprint to be marked as a worm signature anomaly, the system saves the packet. The packets are sent to the system along with the anomalies. The system tries to match the packet against a database of rules that are used to name the worm.

As described above, the worm detection processes can reduce false positives by using fundamental differences between worm and normal traffic. This eliminates the need for maintaining a list of signatures related to false positives which can introduce significant administrative overhead and lack of confidence in the generated signatures.

A number of embodiments of the invention have been described. Nevertheless, it will be understood that various modifications may be made without departing from the spirit and scope of the invention.

What is claimed is:

1. A computer program product residing on a non-transitory computer readable medium for intrusion detection, the computer program product comprising instructions for causing a processor to:
 identify a signature representing content prevalent in network traffic;
 determine if the network traffic that includes content associated with the signature exhibits propagation;
 determine if the network traffic that includes content associated with the signature exhibits connectedness by:
  comparing, to a first threshold, a number of destinations contacted by a host computer system with a packet that includes content associated with the signature;
  determining that the host computer system exhibits connectedness if the number of destinations exceeds the first threshold; and
  determining that the network traffic that includes content associated with the signature exhibits connectedness if a number of host computer systems that exhibit connectedness exceeds a second threshold; and
 generate a worm signature based on the identified signature responsive to the network traffic that includes content associated with the signature exhibiting both connectedness and propagation.

2. The computer program product of claim 1 wherein the instructions to identify a signature representing content prevalent in network traffic comprise instructions to:
 receive packet payload data; and
 analyze the packet payload data to identify recurring sets of bits.

3. The computer program product of claim 2 wherein the instructions to analyze the packet payload data to identify recurring sets of bits comprises instructions to:
 extract a plurality of sets of bits having a predetermined length;
 compute a hash of each of the plurality of sets of bits; and
 count the number of times a particular hash value occurs during a period of time.

4. The computer program product of claim 1 further comprising instructions to:
 consolidate multiple signatures into a single signature.

5. The computer program product of claim 1 wherein the computer program product further comprises instructions for causing a processor to:
 detect email-based worms.

6. The computer program product of claim 5 wherein the instructions for causing a processor to detect email-based worms comprise instructions for causing a processor to:
 identify a second signature representing content prevalent in an email-based network traffic;
 generate a client list for the second signature;
 determine if a number of clients included in the client list exceeds a threshold;
 generate a worm signature based on the second signature responsive to the number of clients included in the client list exceeding the threshold.

7. The computer program product of claim 1 wherein the instructions to determine if the traffic including the signature exhibits propagation comprise instructions to:
 generate a table associated with the propagation of traffic including a particular signature in the network.

8. The computer program product of claim 7, wherein the table comprises a tree with a number of levels, each of the levels including a number of hosts.

9. The computer program product of claim 8 wherein the instructions to determine if the traffic including the signature exhibits propagation comprise instructions to:
 compare the number of levels to a first value;
 compare the number of hosts in each of the levels to a second value; and
 identify the signature as exhibiting propagation if the number of levels is greater than or equal to the first value and the number of hosts in each of the levels is greater than or equal to the second value.

10. A computer-implemented method, wherein the computer includes a processor, the method comprising:
 identifying a signature representing content prevalent in network traffic;
 determining, by the computer, if the network traffic that includes content associated with the signature exhibits propagation;
 determining if the network traffic that includes content associated with the signature exhibits connectedness by:
  comparing, to a first threshold, a number of destinations contacted by a host computer system with a packet that includes content associated with the signature;
  determining that the host computer system exhibits connectedness if the number of destinations exceeds the first threshold; and
  determining that the network traffic that includes content associated with the signature as exhibits connectedness if a number of host computer systems that exhibit connectedness exceeds a second threshold; and
 generating a worm signature based on the identified signature responsive to the network traffic that includes content associated with the signature exhibiting both connectedness and propagation.

11. The method of claim 10, further comprising:
receiving packet payload data; and
analyzing the packet payload data to identify recurring sets of bits.

12. The method of claim 11, further comprising:
extracting a plurality of sets of bits having a predetermined length;
computing a hash of each of the plurality of sets of bits; and
counting the number of times a particular hash value occurs during a period of time.

13. The method of claim 10, further comprising:
identifying multiple signatures; and
consolidating multiple, identified signatures into a single signature.

14. The method of claim 10 further comprising:
detecting email-based worms.

15. The method of claim 10, further comprising:
generating a table associated with the propagation of traffic including a particular signature in the network, the table comprising a tree with a number of levels, each of the levels including a number of hosts.

16. The method of claim 15, further comprising:
comparing the number of levels to a first value;
comparing the number of hosts in each of the levels to a second value; and identifying the signature as exhibiting propagation if the number of levels is greater than or equal to the first value and the number of hosts in each of the levels is greater than or equal to the second value.

17. A computer-implemented instruction detection system, the system comprising:
a memory;
a processor; and
a system to profile network traffic configured to:
identify a signature representing content prevalent in network traffic;
determine if the network traffic that includes content associated with the signature exhibits propagation;
determine if the network traffic that includes content associated with the signature exhibits connectedness by:
comparing, to a first threshold, a number of destinations contacted by a host computer system with a packet that includes that includes content associated with the signature;
determining that the host computer system exhibits connectedness if the number of destinations exceeds the first threshold; and
determining that the network traffic that includes content associated with the signature exhibits connectedness if a number of host computer systems that exhibit connectedness exceeds a second threshold; and
generate a worm signature based on the identified signature responsive to the network traffic that includes content associated with the signature exhibiting both connectedness and propagation.

18. The system of claim 17, wherein profiler is further configured to:
receive packet payload data; and
analyze the packet payload data to identify recurring sets of bits.

19. The system of claim 17, wherein profiler is further configured to:
extract a plurality of sets of bits having a predetermined length;
compute a hash of each of the plurality of sets of bits; and
count the number of times a particular hash value occurs during a period of time.

20. The system of claim 17, wherein the system is further configured to:
generate a table associated with the propagation of traffic including a particular signature in the network, the table comprising a tree with a number of levels, each of the levels including a number of hosts;
compare the number of levels to a first value;
compare the number of hosts in each of the levels to a second value; and
identify the signature as exhibiting propagation if the number of levels is greater than or equal to the first value and the number of hosts in each of the levels is greater than or equal to the second value.

\* \* \* \* \*